US009707512B2

(12) United States Patent
Kortunov et al.

(10) Patent No.: US 9,707,512 B2
(45) Date of Patent: Jul. 18, 2017

(54) AMINE PROMOTION FOR $CO_2$ CAPTURE

(71) Applicants: Pavel Kortunov, Flemington (RU); Michael Siskin, Westfield, NJ (US)

(72) Inventors: Pavel Kortunov, Flemington (RU); Michael Siskin, Westfield, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 300 days.

(21) Appl. No.: 14/085,999

(22) Filed: Nov. 21, 2013

(65) Prior Publication Data

US 2014/0205525 A1 Jul. 24, 2014

Related U.S. Application Data

(60) Provisional application No. 61/745,026, filed on Dec. 21, 2012.

(51) Int. Cl.
  *B01D 53/14* (2006.01)
  *B01D 53/62* (2006.01)
  *C10L 3/10* (2006.01)

(52) U.S. Cl.
  CPC ......... *B01D 53/62* (2013.01); *B01D 53/1475* (2013.01); *C10L 3/104* (2013.01);
  (Continued)

(58) Field of Classification Search
  None
  See application file for complete search history.

(56) References Cited

U.S. PATENT DOCUMENTS

| 4,112,052 A | * | 9/1978 | Sartori | B01D 53/1475 |
|   |   |   |   | 423/228 |
| 4,336,233 A | * | 6/1982 | Appl | B01D 53/1493 |
|   |   |   |   | 252/189 |

(Continued)

FOREIGN PATENT DOCUMENTS

| EP | 0880991 B1 | 9/2001 |
| EP | 0880990 B1 | 4/2002 |

(Continued)

OTHER PUBLICATIONS

International Searching Authority Invitation and Report for PCT/US2013/071188 dated Apr. 10, 2014.

(Continued)

*Primary Examiner* — Anita Nassiri Motlagh
(74) *Attorney, Agent, or Firm* — David M. Weisberg; Andrew T. Ward

(57) ABSTRACT

Promoter amines are used to enhance $CO_2$ uptake by sterically hindered or tertiary amines. The promoter amines can be cyclic amines, including aromatic cyclic amines or bridged cyclic amines. The combination of a promoter amine plus a sterically hindered or tertiary amines allows for improved uptake kinetics while reducing or minimizing the amount of formation of carbamate salts. The promoted sterically hindered or tertiary amines can be used as part of a $CO_2$ capture and release system that involves a phase transition from a solution of amine-$CO_2$ products to a slurry of amine-$CO_2$ precipitate solids.

21 Claims, 7 Drawing Sheets

(52) U.S. Cl.
CPC .............. *B01D 2252/20431* (2013.01); *B01D 2252/602* (2013.01); *B01D 2257/504* (2013.01); *C10L 2290/541* (2013.01); *Y02C 10/04* (2013.01); *Y02C 10/06* (2013.01)

(56) References Cited

U.S. PATENT DOCUMENTS

| | | | |
|---|---|---|---|
| 5,209,914 | A | 5/1993 | Peytavy et al. |
| 5,618,506 | A | 4/1997 | Suzuki et al. |
| 7,718,151 | B1 | 5/2010 | Hu |
| 7,846,240 | B2 | 12/2010 | Gal et al. |
| 2008/0159937 | A1* | 7/2008 | Ouimet .............. B01D 53/1475 423/230 |
| 2009/0199713 | A1* | 8/2009 | Asprion .............. B01D 53/1475 95/236 |
| 2010/0092359 | A1 | 4/2010 | Svendsen et al. |
| 2010/0104490 | A1 | 4/2010 | Bouillon et al. |
| 2010/0105551 | A1* | 4/2010 | Kim .................. B01D 53/1475 502/401 |
| 2010/0154639 | A1 | 6/2010 | Perry et al. |
| 2011/0014100 | A1 | 1/2011 | Bara et al. |
| 2011/0081287 | A1* | 4/2011 | Bouillon ............. B01D 53/1425 423/223 |
| 2011/0171093 | A1 | 7/2011 | Rochelle et al. |
| 2011/0176981 | A1 | 7/2011 | Jacquin et al. |
| 2012/0027663 | A1 | 2/2012 | Pinard Westendorf et al. |
| 2013/0259784 | A1* | 10/2013 | Bedell .................. B01D 53/62 423/228 |

FOREIGN PATENT DOCUMENTS

| | | | | |
|---|---|---|---|---|
| EP | | 0879631 B1 | 5/2002 | |
| EP | | 2514507 A1 | 10/2012 | |
| NO | WO 2011036171 A1 | * | 3/2011 | ......... B01D 53/1475 |
| WO | | 2011147033 A2 | 12/2011 | |
| WO | | 2012034921 A1 | 3/2012 | |

OTHER PUBLICATIONS

Sartori et al., "Sterically Hindered Amines for CO2 Removal from Gases", Industrial & Engineering Chemistry Fundamentals, May 1, 1983, vol. 22, No. 2, pp. 239-249, American Chemical Society.
PCT Application No. PCT/US2013/071188, Communication from the International Searching Authority (International Search Report), Form PCT/ISA/210 dated Sep. 2, 2014, 7 pages.
PCT Application No. PCT/US2013/071188, Communication from the International Searching Authority (Written Opinion), Form PCT/ISA/220, dated Sep. 2, 2014, 9 pages.

* cited by examiner

AMINE PROMOTION FOR CO₂ CAPTURE

CROSS-REFERENCE TO RELATED APPLICATIONS

This application claims the benefit of U.S. Application Ser. No. 61/745,026, filed on Dec. 21, 2012; which is incorporated by reference herein in its entirety.

FIELD OF THE INVENTION

This invention relates to the removal of carbon dioxide and other acid gases from a gaseous stream containing one or more of these gases. In particular, the invention relates to a method for separating an acid gas, e.g., carbon dioxide, from a gas mixture using one or more promoted amines as the sorbent.

BACKGROUND OF THE INVENTION

The removal of carbon dioxide from mixed gas streams is of great industrial importance and commercial value. Carbon dioxide is a ubiquitous and inescapable by-product of the combustion of hydrocarbons and there is growing concern over its accumulation in the atmosphere and its potential role in global climate change. If laws and regulations driven by environmental factors are enacted, capture and sequestration may be required. While existing methods of $CO_2$ capture have been satisfactory for the scale in which they have so far been used, future uses on the far larger scale required for significant reductions in atmospheric $CO_2$ emissions from major stationary combustion sources, such as power stations fired by fossil fuels, makes it necessary to improve the energy efficiency of the processes used for the removal of $CO_2$ from gas mixtures, and thereby to lower the cost of $CO_2$ capture. According to data developed by the Intergovernmental Panel on Climate Change, power generation produces approximately 78% of stationary source emissions of $CO_2$ with other industries such as cement production (7%), refineries (6%), iron and steel manufacture (5%), petrochemicals (3%), oil and gas processing (0.4%), and the biomass industry (bioethanol and bioenergy) (1%) making up the bulk of the total, illustrating the very large differences in scale between power generation on the one hand and all other uses on the other. To this must be added the individual problem of the sheer volumes of gas which will need to be treated. Flue gases generally consist mainly of nitrogen from combustion air, with the $CO_2$, nitrogen oxides, and other emissions such as sulfur oxides making up relatively smaller proportions of the gases which require treatment. Typically, the wet flue gases from fossil fuel power stations typically contain about 7-15 vol % of $CO_2$, depending on the fuel, with natural gas yielding the lowest amounts and hard coals the highest.

Cyclic $CO_2$ sorption technologies such as Pressure Swing Absorption (PSA) and Temperature Swing Absorption (TSA) using liquid sorbents are well-established. The sorbents mostly used include liquid solvents, as in amine scrubbing processes, although solid sorbents are also used in PSA and TSA processes. Liquid amine sorbents dissolved in water are probably the most common sorbents. Amine scrubbing is based on the chemical reaction of $CO_2$ with amines to generate carbonate/bicarbonate and carbamate salts—the aqueous amine solutions chemically trap the $CO_2$ by the formation of one or more ammonium salts, such as carbamate, bicarbonate, and carbonate. The reaction tends to be reversible, and these salts can be converted back to the original components upon suitable adjustment of conditions, usually temperature, enabling the regeneration of the free amine at moderately elevated temperatures. Commercially, amine scrubbing typically involves contacting the acid gas ($CO_2$ and/or $H_2S$) containing gas stream with an aqueous solution of one or more simple alkanolamines selected preferentially, as the hydroxyl group confers greater solubility in water for both the amine(s) and for the reaction product(s). Alkanolamines, such as monoethanolamine (MEA), diethanolamine (DEA), and triethanolamine (TEA), as well as a limited set of hindered amines, are currently used in commercial processes. The cyclic sorption process requires high rates of gas-liquid heat exchange, the transfer of large liquid inventories between the sorption and regeneration zones, and high energy requirements for the regeneration of amine solutions. The corrosive nature of amine solutions containing the sorbed $CO_2$, which forms the amine-$CO_2$ reaction products, can also be an issue. Without further improvement, these difficulties would limit the economic viability of the aqueous amine scrubbing processes in very large scale applications.

The cyclic sorption processes using aqueous sorbents typically require a significant temperature differential in the gas stream between the sorption and desorption (regeneration) parts of the cycle. In conventional aqueous amine scrubbing methods, relatively low temperatures (e.g., less than 50° C.) are required for $CO_2$ uptake, with an increase to a temperature above about 100° C. (e.g., 120° C.) required for desorption. The heat required to maintain the thermal differential is a major factor in the cost of the process. With the need to regenerate the solution at temperatures above 100° C., the high latent heat of vaporization of the water (~2260 kJ/Kg at ~100° C.) obviously makes a significant contribution to the total energy consumption. If $CO_2$ capture is to be conducted on the larger scale appropriate to use in power plants, more effective and economical separation techniques need to be developed.

Another area where more efficient $CO_2$ separation processes are needed is in enhanced oil recovery (EOR), where $CO_2$ is re-injected into the gas or liquid hydrocarbon deposits to maintain reservoir pressure. With the advanced age of many producing reservoirs worldwide and the ever-increasing challenge of meeting demand, the expanding use of EOR methods is becoming more widespread. Typically, the source of carbon dioxide for EOR is the producing hydrocarbon stream itself, which may contain anywhere from less than 5% to more than 80% of $CO_2$. Other options are capture of $CO_2$ from the flue gases of various combustion sources and pre-combustion capture of $CO_2$ from shifted syngas produced in fuel gasification processes.

The use of sterically hindered amines for $CO_2$ capture was proposed by Sartori and Savage in "Sterically Hindered Amines for $CO_2$ Removal from Gases," *Ind. Eng. Chem. Fundamen.*, 1983, 22(2), 239-249, pointing out that sterically hindered amines can have unique capacity and rate advantages in $CO_2$ sorption processes—their rich solutions can be desorbed to a greater extent than their non-substituted and/or less hindered counterparts, thus producing a leaner solution (lower total carbamate/bicarbonate/carbonate concentration), which tends to result in a greater mass transfer upon reabsorption. A limited number of processes using sterically hindered amines as alternatives to MEA, DEA, and TEA are used commercially for $CO_2$ capture; examples include the KS-1™ Process from Mitsubishi Heavy Industries and Kansai Electric Power Co and the ExxonMobil Flexsorb® Process, which uses sterically hindered amine(s) for selective $H_2S$ separation. Processes using solid sorbents are also known; they may avoid some of the limitations of amine scrubbing, such as large capital investment and high regeneration energy intensity, but they suffer from a lack of sorbents having sufficiently selective $CO_2$ sorption under the humid conditions present in combustion flue gas and from the difficulty in designing gas/solid contactors to process large volumes of gas at high throughput rates.

U.S. Pat. No. 5,618,506 describes a process for removing carbon dioxide from gases. In a first aspect, $CO_2$ is removed from a gas stream by contacting the gas stream with a solution containing a first alkanolamine that optionally also contains a second amine compound. The first alkanolamine is generically described as being present in an amount of 15-65 wt %, while the second amine is generically described as being present in an amount of 1.5-50 wt %. One option described for the first alkanolamine is 2-methylamino-2-methyl-1-propanol. One option described for the second amine compound is piperazine. All of the process is described as occurring in solution, and there is no mention of forming a precipitate or slurry during the process of removing the carbon dioxide.

European Patent No. EP 0 879 631 describes a process for removing carbon dioxide from gases. A gas stream containing $CO_2$ is contacted with a solution that contains a tertiary amine, such as 2-dimethylamino ethanol, that also contains a secondary amine, such as piperazine, where the concentration of the tertiary amine is within 10 wt % of the concentration that would result in maximum $CO_2$ absorption if the tertiary amine was used alone, and where the concentration of the secondary amine is at least about 10 wt %.

SUMMARY OF THE INVENTION

In an embodiment, a method for separating carbon dioxide from a gas stream is provided, the method including: contacting a gas stream containing $CO_2$ in a sorption zone with a sorption solution comprising a promoter amine and at least one of a sterically hindered amine and a tertiary amine, the sorption solution having a total amine concentration of at least about 3.0 M, at a temperature of at least 10° C. to sorb at least a portion of the $CO_2$ into the sorption solution and form a rich stream of the sorbed $CO_2$ in the sorption solution comprising one or more amine-$CO_2$ reaction products dissolved in the solution; passing the rich stream from the sorption zone to a second zone and precipitating at least a portion of the amine-$CO_2$ reaction products to form a precipitate slurry; separating the precipitate slurry to form a portion enriched in precipitate solids and a first recycle stream, the first recycle stream comprising a majority of the solvent from the precipitate slurry; and passing the portion enriched in precipitate solids to at least one regeneration zone and desorbing the sorbed carbon dioxide as gas to form a second recycle stream, the second recycle stream containing a lower concentration of carbon dioxide than the rich stream and containing an increased concentration of total amine relative to the rich stream, wherein the aqueous sorption solution comprises at least a portion of the first recycle stream and at least a portion of the second recycle stream.

In another embodiment, a method for separating carbon dioxide from a gas stream is provided, the method including: contacting a gas stream containing carbon dioxide in a sorption zone with an aqueous sorption solution comprising a promoter amine and a sterically hindered amine, the sorption solution having a total amine concentration of at least about 3.0 M, at a temperature of at least 10° C. to sorb at least a portion of the carbon dioxide into the sorption solution and form a rich stream of the sorbed carbon dioxide in the sorption solution comprising amine-carbon dioxide reaction products dissolved in the solution; passing the rich stream from the sorption zone to one or more regeneration zones and desorbing the sorbed carbon dioxide as gas to form a recycle stream, the recycle stream containing a lower concentration of carbon dioxide than the rich stream and containing an increased concentration of amine relative to the rich stream, the aqueous sorption solution comprising at least a portion of the recycle stream, wherein the promoter amine is a non-hindered primary or secondary amine, an alkanolamine, an aminoether, or a cyclic or acyclic tertiary amine, the sterically hindered amine preferably comprising an aminoalkanol, an aminoether, or a difunctional amine.

In still another embodiment, a method for separating carbon dioxide from a gas stream is provided, the method including: contacting a gas stream containing carbon dioxide in a sorption zone with an aqueous sorption solution comprising a promoter amine and a tertiary amine, the sorption solution having a total amine concentration of at least about 3.0 M, at a temperature of at least 10° C. to sorb at least a portion of the carbon dioxide into the sorption solution and form a rich stream of the sorbed carbon dioxide in the sorption solution comprising amine-carbon dioxide reaction products dissolved in the solution; passing the rich stream from the sorption zone to one or more regeneration zones and desorbing the sorbed carbon dioxide as gas to form a recycle stream, the recycle stream containing a lower concentration of carbon dioxide than the rich stream and containing an increased concentration of amine relative to the rich stream, the aqueous sorption solution comprising at least a portion of the recycle stream, wherein the sorption solution comprises 9 wt % or less of the promoter amine, the tertiary amine comprising an aminoalkanol, an aminoether, or a difunctional amine.

In yet another embodiment, a method for separating carbon dioxide from a gas stream is provided, the method including: contacting a gas stream containing carbon dioxide in a sorption zone with an aqueous sorption solution comprising a promoter amine and a second amine, the second amine being present in a greater amount than the promoter amine, the sorption solution having a total amine concentration of at least about 3.0 M, at a temperature of at least 10° C. to sorb at least a portion of the carbon dioxide into the sorption solution and form a rich stream of the sorbed carbon dioxide in the sorption solution comprising amine-carbon dioxide reaction products dissolved in the solution; passing the rich stream from the sorption zone to one or more regeneration zones and desorbing the sorbed carbon dioxide as gas to form a recycle stream, the recycle stream containing a lower concentration of carbon dioxide than the rich stream and containing an increased concentration of amine relative to the rich stream, the aqueous sorption solution comprising at least a portion of the recycle stream, wherein the promoter amine is a non-hindered primary or secondary amine, an alkanolamine, an aminoether, or a cyclic or acyclic tertiary amine.

DETAILED DESCRIPTION OF THE EMBODIMENTS

Overview

Figure 1:
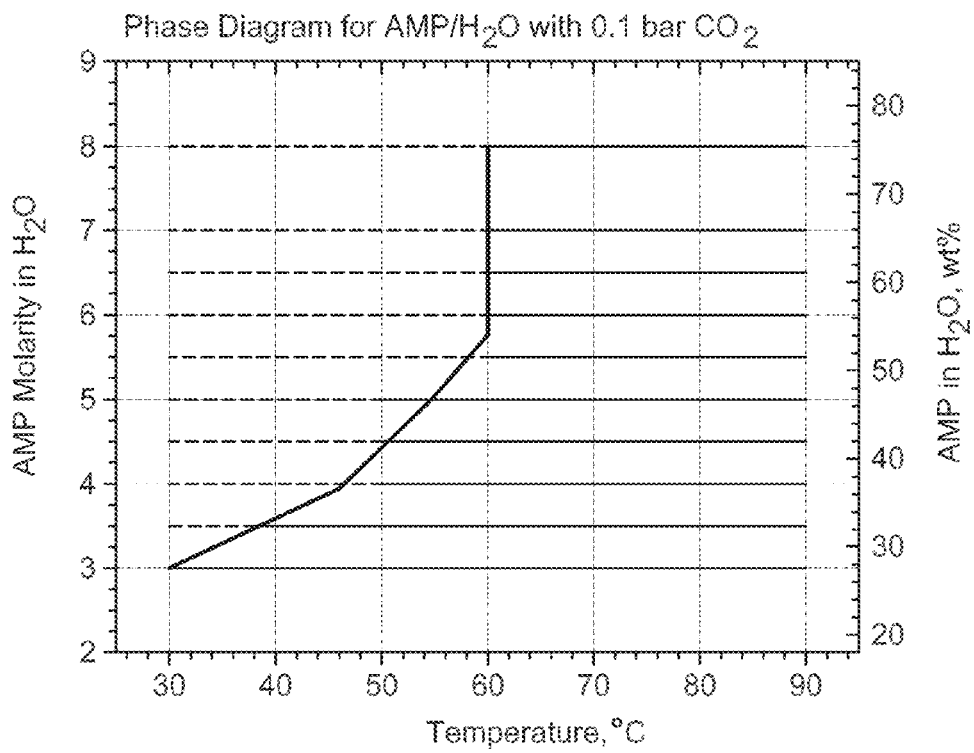
FIG. 1 shows a phase diagram for 2-amino-2-methyl propanol (AMP).

In various aspects, methods are provided for performing $CO_2$ capture (sorption) and release (regeneration) processes using sterically hindered amines and/or tertiary amines with a promoter amine. Various types of amines can be capable of forming at least two types of initial products when reacting with $CO_2$. One type of product can be a bicarbonate salt, while a second type of product can be a carbamate salt. The bicarbonate salt can be a desirable product to form during a $CO_2$ capture process, due to the favorable ~1:1 stoichiometry of amine to $CO_2$ in the product. By contrast, carbamate salts typically have a ~2:1 stoichiometry of amine to $CO_2$. It is noted that carbonate salts can also be selectively formed under certain (e.g., more basic) conditions. Such carbonate salts having a ~2:1 stoichiometry of amine to $CO_2$, the conditions can be selected to reduce/minimize carbonate formation.

Unfortunately, for some sterically hindered amines and/or tertiary amines, formation of a bicarbonate product can be relatively slow. This can be due in part to a limited ability (or inability) of the sterically hindered and/or tertiary amines to form a carbamate as an intermediate. For at least some tertiary amines, direct formation of a carbamate product may simply not be available as a reaction pathway. For sterically hindered amines, formation of a stable carbamate product can either be unavailable or the reaction pathway for forming a carbamate also has a relatively low reaction rate, so that carbamate formation does not provide a significant improvement in the rate of bicarbonate formation (as compared to direct formation of bicarbonate salt).

The rate of formation of bicarbonates with hindered amines and tertiary amines (~1:1 stoichiometry of amine to $CO_2$) can generally be slower than the reaction of $CO_2$ with unhindered primary and secondary amines that can form carbamates with a ~2:1 stoichiometry of amine to $CO_2$. It has been determined that the rate of formation of bicarbonates with hindered amines and/or tertiary amines can be significantly enhanced by co-use of promoters. Promoters can include nucleophilic amines, such as piperazines and/or piperidines, which can themselves interact (react) more rapidly with $CO_2$. The more nucleophilic unhindered amine promoters can more rapidly attack $CO_2$ and can form a zwitterion, a carbamic acid, or a mixed carbamate. For the mixed carbamate, the hindered or tertiary amine can play a role of counterion in forming the mixed carbamate. In the presence of water, the reaction product can hydrate, and $CO_2$ can be transferred as a bicarbonate anion to the hindered and/or tertiary amine at a faster rate than formation of a bicarbonate via direct $CO_2$ sorption by the hindered and/or tertiary amine. After transfer of carbon dioxide to a sterically hindered and/or tertiary amine as a bicarbonate ion, the promoter compound can be available to perform another cycle of ion formation and transfer.

In some embodiments, one method for taking advantage of amine promotion can be to use an amine promoter in a system including phase changes for amine-$CO_2$ salts during the capture and release cycle. Such processes can take advantage of phase changes between solutions of amine-$CO_2$ reaction products and can precipitate slurries where the slurry particles can include precipitates formed based on the amine-$CO_2$ reaction products. For example, an amine solution can be used to capture $CO_2$ from a gas phase stream. During this initial capture process, the amine-$CO_2$ reaction product can remain in solution. Preferably, a portion of the amines in the amine solution can be promoter amines to facilitate capture of the $CO_2$ during the capture process. The solution containing the amine-$CO_2$ reaction product can then be exposed to a set of conditions which can result in precipitation of a portion of the amine-$CO_2$ reaction product to form a slurry. This can occur in the capture stage or vessel, or preferably this can occur in a stage or vessel downstream from the capture stage or vessel. The conditions for causing precipitation can include a change in the temperature of the solution, addition of additional $CO_2$ to the solution, a change in pH for the solution, or a combination thereof.

After capturing $CO_2$ and forming a precipitate slurry of the amine-$CO_2$ reaction product, the precipitate slurry can be passed into one or more release stages where the conditions for the slurry can be altered to allow for release of the $CO_2$. This can also typically result in regeneration of the amine solution, so that the amine solution can be used again in the $CO_2$ capture stage. Because a portion of the water can be separated out from the precipitate slurry prior to release/regeneration, less heating and/or cooling can be required to achieve desired process temperatures. It is noted that the release process may not necessarily result in release of all $CO_2$, so that the regenerated amine solution may contain at least some amine-$CO_2$ reaction product before being exposed again to a $CO_2$-containing gas stream.

Gas Stream

Gas streams particularly amenable to treatment by the present sorption processes can include, but are not necessarily limited to, flue gas from the combustion of carbonaceous fuels and natural gas from subterranean sources. Flue gas streams may originate from the combustion of carbon-containing fossil fuels such as natural gas, lignite coals, sub-bituminous coals, bituminous coals, and anthracite coals. Their $CO_2$ content may typically vary from about 3-15 vol %, depending on the fuel, with the highest levels coming from hard coal combustion and the lowest from natural gas. Natural gas streams containing carbon dioxide may contain, in addition to methane and carbon dioxide, one or more other gases such as ethane, propane, n-butane, isobutane, hydrogen, carbon monoxide, ethene, ethyne, propene, nitrogen, oxygen, helium, carbonyl sulfide, hydrogen sulfide, and the like, as well as, in some cases, mercury or other metal contaminants, if they have not been removed by other pre-treatment. Additional or alternative streams that can be treated by the present separation process can include syngas and shifted syngas produced in fuel gasification processes, gas streams produced in the manufacture of hydrogen, for example from methane steam reforming, and gas streams from refinery and petrochemical plants, whose compositions can naturally depend on the process from which they are derived. Water is typically likely to be present both in flue gases and in natural gas from combustion of hydrocarbon fuels or from contact with ground waters. For embodiments involving a non-aqueous solvent, although the present process can accept water in the entering gas stream, removal of substantial quantities may be desirable when release or regeneration is performed at a temperature below about 100° C. For example, water can be removed by treatment with a drying agent or by cooling to condense water, and thereby to reduce the water content, e.g., so as to avoid an undesirable accumulation of water in an otherwise non-aqueous process. It is also noted that a typical furnace flue gas can contain about 7 wt % carbon dioxide and also about 7 wt % water. This can be approximately a 1:1 ratio, which can provide enough water to hydrate the carbon dioxide to bicarbonate ion without adding extra water and/or without having to remove extra water if regeneration is carried out below ~100° C.

The pressure of the gas stream can vary according to its origin; natural gas streams can typically be encountered at higher pressures than flue gas streams, and streams from refinery and petrochemical units can vary according to the processing conditions used in the unit. Flue gas streams can typically exhibit roughly atmospheric pressures, which can be as low as ~0.90 bara (~90 kPaa) but the partial pressure of the carbon dioxide in the flue gas stream can typically be in the range from about 0.03 bar (about 3 kPa) to about 0.1 bar (about 10 kPa) or from 0.03 bar (about 3 kPa) to 0.15 bar (about 15 kPa), with relatively large amounts of nitrogen from combustion air typically resulting in relatively low $CO_2$ partial pressures in the stream (e.g. ~1 vol % $CO_2$ in $N_2$ or oxygen-depleted air in the total flue gas at ~1 bara (~100 kPaa) can result in a $CO_2$ partial pressure of ~0.01 bar (~1 kPa) in the flue gas; ~10 vol % $CO_2$ in $N_2$ or oxygen-depleted air in the total flue gas at ~1 bara (~100 kPaa) can result in a $CO_2$ partial pressure of ~0.1 bar (~10 kPa) in the flue gas; etc.). The partial pressure of the $CO_2$ in the sorption zone (tower inlet) can typically be at least about 0.025 bar (~2.5 kPa), and in most cases at least about 0.03 bar (~3 kPa).

Amine Promoters

The process by which $CO_2$ can be sorbed by tertiary amines is believed to proceed by dissolution of the gaseous $CO_2$ in water to form carbonic acid ($H_2CO_3$), which can be neutralized by the amine to form an ammonium bicarbonate. At high pH, the ammonium bicarbonate may then react with a second mole of amine to form an ammonium carbonate. In addition to direct formation of bicarbonate, primary and secondary amines may also react directly with the $CO_2$ to form an ammonium carbamate, which itself can be stable in the presence of water and may appear as a significant reaction product, especially at high amine concentration. Carbamate formation by primary and secondary amines is believed to occur based on the initial formation of an unstable zwitterion intermediate, which can rapidly decompose via internal proton transfer to the carbamic acid. Both the zwitterion and the carbamic acid can typically be unstable, and it is not known which equilibrium form undergoes further reaction, although it is posited that it can be the carbamic acid, which may be deprotonated by a second equivalent of free amine to produce the ammonium carbamate salt with the overall stoichiometric requirement of two moles of amine per one mole of carbon dioxide sorbed (0.5:1 $CO_2$:amine).

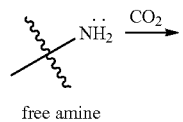

free amine

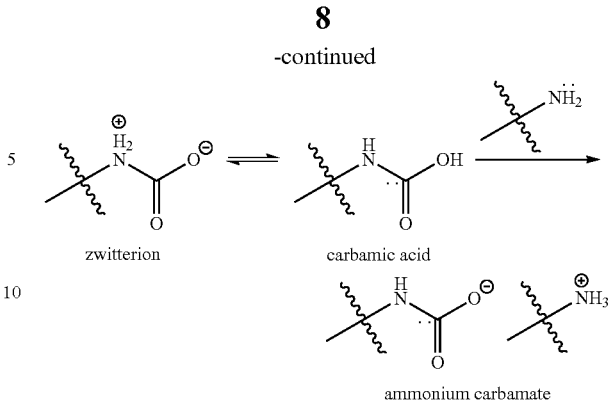

zwitterion         carbamic acid ammonium carbamate

Further reaction of the carbamate with water may lead to a final bicarbonate product with a ~1:1 $CO_2$:amine ratio, or to a carbonate product with a ~0.5:1 $CO_2$:amine ratio, e.g., depending on solution pH.

Due to the lack of a free proton, tertiary amines are typically incapable of forming a carbamate using the above reaction mechanism. As a result, the only reaction pathway for a tertiary amine to form a $CO_2$-amine salt reaction product can be via the direct pathway for bicarbonate formation, which is a relatively slow $CO_2$-amine reaction pathway.

As noted above, at least some primary and secondary amines can form either a bicarbonate or a carbamate salt. However, some sterically hindered amines can have a slower reaction rate for formation of carbamate salts. A sterically hindered amine can be defined as an amine where a least one carbon that the amine is bonded to (i.e., an alpha carbon) has one or fewer hydrogen atoms as substituents. Preferably, the carbon with one or fewer hydrogens can be part of the primary/backbone carbon chain for the amine compound. For some sterically hindered amines, and particularly sterically hindered secondary amines, the steric hindrance can result in a carbamate formation pathway not substantially different in reaction rate in comparison with the pathway for formation of a bicarbonate. Thus, both tertiary amines and sterically hindered amines can lack a fast reaction pathway for formation of a $CO_2$-amine salt. This can reduce the ability to use such amines for $CO_2$ capture processes.

In addition to the working capacity of a system, the rate of sorption of $CO_2$ can also be important. For sterically hindered and/or tertiary amines with slower reaction pathways, an alternative to direct formation of bicarbonate salt can be to use a promoter amine to provide an alternative reaction pathway. The formation of a zwitterion or carbamate using a promoter amine can occur via a relatively fast reaction pathway. The transfer of carbon dioxide from a promoter amine carbamate to form a bicarbonate on another amine can also be a relatively fast reaction pathway. For amines with a relatively slow pathway for formation of a bicarbonate ion, addition of a promoter amine can increase the rate of $CO_2$ capture.

It has been experimentally determined that the rate of the proposed two-step reaction (i.e., via a carbamate intermediate) can be faster than direct bicarbonate formation with hindered or tertiary amines. Since a promoter can be used to transfer $CO_2$ from the gas phase into a bicarbonate of a hindered or tertiary amine, only small amount of promoter may be required. However, a portion of the products from amine-$CO_2$ reactions in a promoted amine system can include promoter-$CO_2$ reaction products. In some embodiments, the amount of promoter amine can correspond to a concentration of about 9 wt % or less in the sorption solution, e.g., about 7 wt % or less or about 5 wt % or less. In other embodiments, the amount of promoter amine can range from about 3 wt % to about 20 wt % of the sorption solution.

For relatively high efficiency in a cyclic process, the basicity of a selected promoter can be lower than the basicity of the promoted hindered and/or tertiary amine. Suitable promoter compounds can include non-hindered primary or secondary amines, alkanolamines, and acyclic or cyclic tertiary amines. The following are examples of compounds that can serve as promoters for hindered and/or tertiary amines

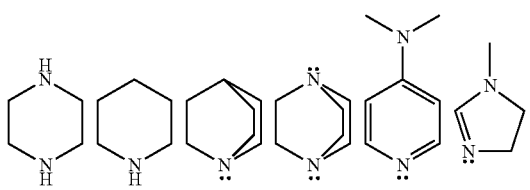

The compounds above correspond to piperazine, piperidine, bridged (multicyclic) derivatives of piperidine and piperazine, 4-dimethylamino pyridine, and N-methyl imidazoline.

Amine Sorbents

In some embodiments, the amines used for $CO_2$ capture can be sterically hindered amines, such as sterically hindered primary or secondary amines. The sterically hindered amines can have no more than one proton (hydrogen atom) on the carbon atom alpha to an amino group. Preferably, the hindered amines can correspond to amines with sufficient steric hindrance such that the amine does not form a high concentration of carbamate and/or can form a carbamate with relatively low stability, such as a carbamate that can relatively rapidly decompose to form a bicarbonate. In some other embodiments, the amine can be a tertiary amine. The sterically hindered amines and/or tertiary amines can be combined with a promoter amine in order to facilitate (e.g., to obtain an improved rate of) capture of $CO_2$, while still maintaining the favorable capture/recycle properties of the sterically hindered and/or tertiary amines. This can improve the potential working capacity for the hindered amines by reducing/minimizing the amount of carbamate formed during $CO_2$ capture. Additionally, by selecting an amine where the bicarbonate form can be the primary (or only) stable salt, precipitation of the amine can be more readily controlled. In particular, when precipitation is induced, all or nearly all of the amine salts in solution (or alternatively all of the amine salts above the solubility limit) can advantageously participate in the solid-liquid equilibrium for precipitation, as opposed to having a portion of the amine salts that are soluble in solution, while another portion is precipitating. Having primarily (or only) a stable bicarbonate form for the amine salts can also be beneficial from a stoichiometry standpoint, as the ratio of amine to sorbed $CO_2$ can be ~1:1 for a bicarbonate salt, while the ratio for a carbamate salt can be ~1:0.5. Although the addition of the promoter amine may influence the ratio of bicarbonate to carbamate in the amine-$CO_2$ reaction products, this can be offset by the increase in the $CO_2$ capture rate for the amine solution. Preferably, the precipitated reaction products can include at least about 70 wt % of bicarbonate salts (as opposed to carbamate salts), e.g., at least about 75 wt % or at least about 80 wt %.

Due to their high basicity and steric hindrance on the amino group, sterically hindered amines can allow fine tuning of the types of reaction products and/or precipitates by adjusting conditions (e.g., temperature, pressure, concentration, etc.) of the composition of $CO_2$-amine reaction products. The formation of carbamate and bicarbonate reaction products can be partly or completely controlled by using selected sterically hindered amines. For example, some types of sterically hindered amines can form a carbamate salt, but the salt may have a short lifetime and can quickly convert to the more desirable bicarbonate salt, according to the following proposed mechanism:

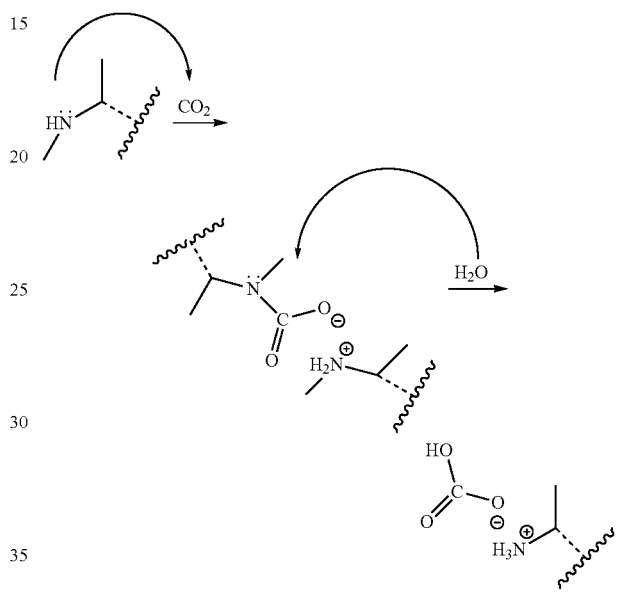

For some types of sterically hindered amines and/or tertiary amines, forming a bicarbonate salt via an intermediate carbamate salt can provide a faster reaction pathway than direct formation of the bicarbonate salt.

Some examples of sterically hindered amines suitable for use in a $CO_2$ separation process can include alkanolamines/aminoethers described by the general formula:

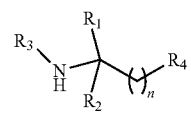

where $R_1$ is hydrogen or a $C_1$-$C_4$ alkyl or hydroxyalkyl group (e.g., —$CH_3$, —$C_2H_5$, —$CH_2OH$, or —$C_2H_4OH$); $R_2$ is a $C_1$-$C_4$ alkyl or hydroxyalkyl group, (e.g., —$CH_3$, —$C_2H_5$, —$CH_2OH$, or —$C_2H_4OH$); $R_3$ is hydrogen or a $C_1$-$C_4$ alkyl group, (e.g., $CH_3$); and $R_4$ is —OH or —$OR_5$, where $R_5$ is —($CH_2$)—$C(R_1R_2)$—$NHR_3$; and (each) n is an integer from 1 to 4 (e.g., from 1 to 3). In one embodiment, the sterically hindered amine can correspond to a structure where $R_1$ is —$CH_3$, $R_2$ is —$CH_3$, $R_3$ is hydrogen or —$CH_3$, $R_4$ is —OH, and n is 1. For such an embodiment, if $R_3$ is hydrogen, the structure corresponds to 2-amino-2-methyl-1-propanol (AMP), while, if $R_3$ is —$CH_3$, the structure corresponds to 2-N-methylamino-2-methyl-1-propanol (MAMP). Such embodiments may be useful for processes where a precipitate slurry is formed. In another embodiment for solution phase processes, $R_1$ can be hydrogen, $R_2$ can be —$CH_3$, $R_3$ can be methyl, $R_4$ can be —OH, and n can be 1, which corresponds to 2-methylamino-1-propanol (MAP). Optionally, the sterically hindered amines can correspond to amines with a molecular weight of about 180 amu or less, such as about 150 amu or less, or about 120 amu or less, or about 100 amu or less.

Figure 8:
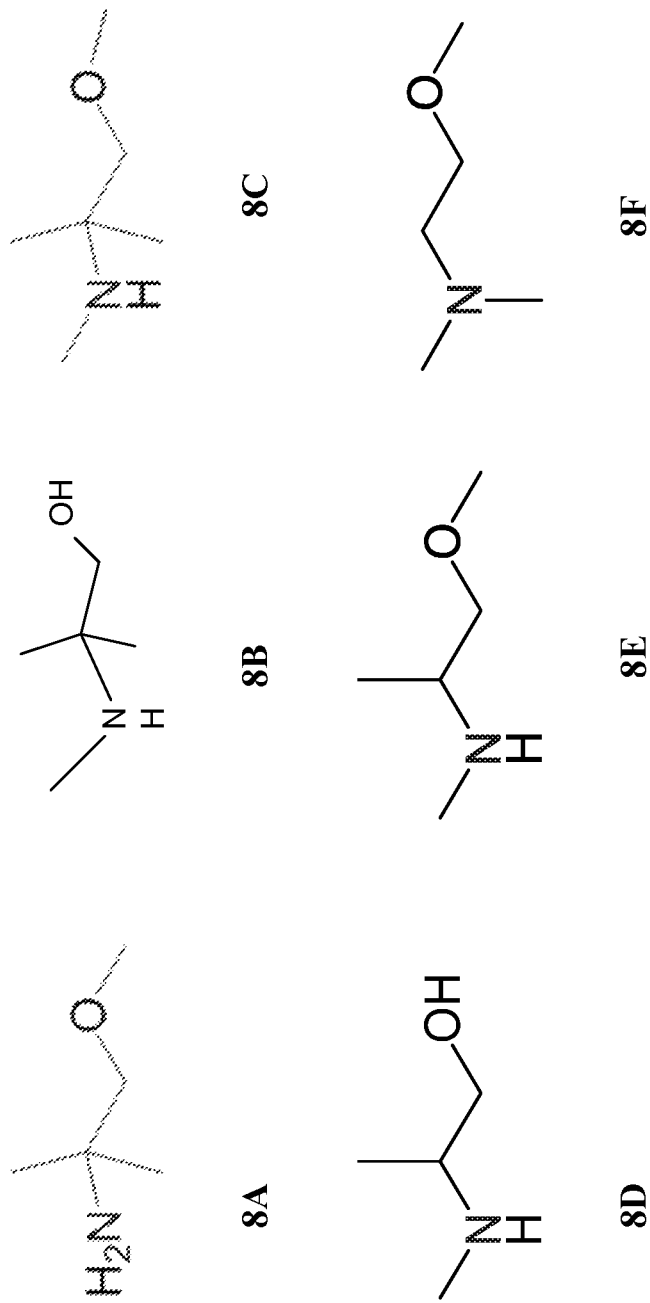
FIG. 8 shows examples of potential amines for use as sorbents for $CO_2$ capture.

Still other options for compounds based on formula (1) can include the compounds shown in FIGS. 8A-C. FIG. 8(A) shows a compound where $R_1$ is —$CH_3$, $R_2$ is —$CH_3$, $R_3$ is H, n is 1, and $R_4$ is —$OR_5$, and $R_5$ is —$CH_3$. This corresponds to the methyl ether of AMP. FIG. 8(B) shows a compound where $R_1$ is —$CH_3$, $R_2$ is —$CH_3$, $R_3$ is —$CH_3$, n is 1, and $R_4$ is —OH. This corresponds to MAMP as described above. FIG. 8(C) shows a compound where $R_1$ is —$CH_3$, $R_2$ is —$CH_3$, $R_3$ is —$CH_3$, n is 1, and $R_4$ is —$OR_5$, and $R_5$ is —$CH_3$, which corresponds to the methyl ether of MAMP.

Some other examples of amines include alkanolamine/aminoether structures (such as tertiary alkanolamine/aminoether structures) that can be described by the general formula:

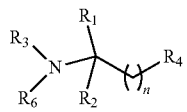

where $R_1$ is hydrogen or a $C_1$-$C_4$ alkyl or hydroxyalkyl group (e.g., —$CH_3$, —$C_2H_5$, —$CH_2OH$, or —$C_2H_4OH$); $R_2$ is hydrogen or a $C_1$-$C_4$ alkyl or hydroxyalkyl group, (e.g., —$CH_3$, —$C_2H_5$, —$CH_2OH$, or —$C_2H_4OH$); $R_3$ is hydrogen or a $C_1$-$C_4$ alkyl group, (e.g., $CH_3$); $R_4$ is —OH or —$OR_5$, where $R_5$ is a $C_1$-$C_4$ alkyl group or —($CH_2$)—$C(R_1R_2)$—$NR_3R_6$; $R_6$ is hydrogen or a $C_1$-$C_4$ alkyl group, (e.g., $CH_3$); and (each) n is an integer from 1 to 4 (e.g., from 1 to 3).

Examples of suitable amines can include those shown in FIGS. 8D-F. FIG. 8(D) shows a structure where $R_1$ is —$CH_3$, $R_2$ is H, $R_3$ is —$CH_3$, $R_4$ is —OH, and $R_6$ is H. This corresponds to the structure for MAP. FIG. 8(E) shows a structure where $R_1$ is —$CH_3$, $R_2$ is H, $R_3$ is —$CH_3$, $R_4$ is —$OR_5$, $R_5$ is —$CH_3$, and $R_6$ is H. This corresponds to the methyl ether of MAP. FIG. 8(F) shows a structure where a structure where $R_1$ is H, $R_2$ is H, $R_3$ is —$CH_3$, $R_4$ is —OH, and $R_6$ is —$CH_3$. This corresponds to the methyl ether of dimethylaminoethanol.

Another aspect of selecting a suitable sterically hindered amine can involve solution loading, in particular to select an amine that can be loaded to a relatively high concentration in solution while maintaining a low enough viscosity to allow for desirable flow characteristics. For example, an ~3M solution of AMP (~27 wt %) in water at around 45° C. can have a viscosity of about 2.5 cP. More generally, in some embodiments, the viscosity of an amine solution can be about 15 cP or less, such as about 10 cP or less, about 8 cP or less, about 7 cP or less, or about 5 cP or less.

In various embodiments, the amount of amine in solution can be an amount that provides for a desirable amount of $CO_2$ sorption while maintaining a desirable viscosity for flow within the reaction system. Preferred concentrations may vary with the particular amine, as the desirable concentration can also depend on the concentration that causes precipitation under favorable conditions. In certain embodiments, the amine concentration can be at least about 1.5M, e.g., at least about 2.0M, at least about 2.5M, at least about 3.0M, at least about 4.0M, or at least about 5.0M. Additionally or alternatively, the amount of amine concentration can be about 9.0M or less, e.g., about 8.0M or less, about 7.0M or less, or about 6.0M or less.

Sorption/Regeneration Process

The stability of the $CO_2$/amine species can generally decrease with increasing temperature, so that sorption of the $CO_2$ can be favored by lower temperatures, but, with operation with flue gas, the temperature can typically be higher, unless the incoming gas stream is initially cooled. With natural gas streams, the temperature can often be lower, particularly if the gas has been passed through an expansion before entering the scrubbing unit. The sorption temperature can typically be at least about 10° C. (e.g., at least about 15° C., at least about 20° C., at least about 25° C., at least about 30° C., at least about 35° C., at least about 40° C., at least about 45° C., at least about 50° C., at least about 55° C., at least about 60° C., at least about 65° C., at least about 70° C., at least about 75° C., or at least about 80° C.) and/or at most about 90° C. (e.g., at most about 85° C., at most about 80° C., at most about 75° C., at most about 70° C., at most about 65° C., at most about 60° C., at most about 55° C., at most about 50° C., at most about 45° C., or at most about 40° C.). In most embodiments, however, a maximum temperature for the sorption can be about 75° C., and, if operation is feasible at a lower temperature (e.g., with a chilled incoming natural gas or refinery process stream), resort may be advantageously made to lower temperatures at this point in the cycle. A sorption temperature of about 70° C. can be a suitable target value for flue gas scrubbing. Temperatures below about 50° C. are likely to be favored for optimal sorption, if capable of attainment at relatively low incremental cost and/or if the incoming gas stream is already at such a temperature; these lower sorption temperatures can be routinely obtainable using a variety of well-known gas stream cooling methods, such as direct contact of a $CO_2$-containing gas stream with a chilled water spray or an air cooler. Temperatures below about 50° C., such as about 35° C. to about 45° C., are also more suitable for sorption of $CO_2$ in processes where a precipitate slurry is formed after sorption.

The $CO_2$ can be desorbed from the sorbent material by any appropriate steps, such as conventional methods including but not limited to temperature swing, pressure swing, and stripping with an inert (non-reactive) gas stream such as nitrogen, hot $CO_2$, or steam in the regeneration tower. Temperature swing operation can often be a choice in conventional cyclic sorption plants. The temperature of the rich solution from the sorption zone can be raised in the regeneration tower, e.g. by passage through a heat exchanger at the tower bottom or with steam or other hot gas. Desorption temperatures can be dependent on the vapor/liquid equilibria for the selected system, e.g. amine and/or $CO_2$ concentration, and can typically be at least 10° C. above, e.g., at least 15° C. above or at least 20° C. above, the temperature in the sorption zone. Typical temperatures in the regeneration zone can be higher than the temperature of the sorption zone and usually above 100° C. (e.g., 120° C.±10° C.), and temperatures above 120° C. may be preferable to generate the $CO_2$ product at higher pressures. However, temperatures at or just below 100° C. (e.g., from about 65° C. to about 100° C.) may be used, if allowance is made for accumulation of water vapor and if carbamate decomposition rate is appropriately high. Thermal desorption, e.g., by passing the rich solution through a hot bath with a head space at controlled pressure (typically about 1.0 bar), can be a preferred option. Pressure control can be effected by removal of the desorbed gas at an appropriate rate. Pressure swing sorption can be less favored in view of the need for recompression; the pressure drop can be determined by the vapor-liquid equilibria at different pressures.

For a solution phase process, a slip stream of the previously separated $CO_2$ may additionally or alternatively be used for stripping, although the concentration of residual $CO_2$ in the lean sorbent stream returning to the sorption tower may be higher, and compensation to lower the $CO_2$ partial pressure in the tower can be necessary to facilitate carbamate decomposition. The reduction in the $CO_2$ partial pressure from gas stripping can promote desorption of the gas, and, when this expedient is used, there may not be a requirement for a significant pressure reduction, although the pressure may be reduced for optimal stripping, suitably to the levels used in pressure swing operation. Stripping with mixtures of an inert (relatively unreactive) gas and hot $CO_2$ may be effective. When carrying out the desorption by inert gas sparging and/or pressure swing operation, the temperature may be maintained at a value at or close to that used in the sorption step, although desorption can be favored by an increase in temperature from the sorption zone to the regeneration zone, either with or without stripping or a decrease in pressure. When stripping with previously separated $CO_2$, desorption of the $CO_2$ from the rich solution stream can be favored by heating the $CO_2$ stripping gas.

Sorption/Regeneration Process—Solution Phase Capture and Slurry Phase Release

One option for improving the working capacity of certain hindered amines can be to take advantage of a phase transition, so that captured $CO_2$ can be precipitated prior to release or regeneration. In this type of embodiment, $CO_2$ capture can be performed (at least in part) in a solution phase, while release can be performed in a slurry phase. This can be accomplished by intentionally inducing a phase transition between the solution and slurry phases at a desired location in a $CO_2$ capture and release system.

FIG. 1 shows a phase diagram for a solution of 2-amino-2-methyl-1-propanol (AMP) at a constant gas phase $CO_2$ partial pressure of ~0.1 bar (~10 kPa), where the horizontal axis is temperature and the vertical axis is the concentration of AMP in aqueous solution. The dotted lines in the left portion of the figure represent portions of phase space where a solid phase is present at equilibrium (such as a precipitate slurry), while the solid lines to the right represent a solution only. About 0.1 bar (about 10 kPa) was selected in FIG. 1 as being a representative partial pressure of $CO_2$ that may be encountered when a gas stream containing $CO_2$ is contacted with an amine solution for carbon capture. Based on FIG. 1, AMP can be an example of an amine having a solid-liquid phase transition at temperatures between ~30° C. and ~60° C. for some solutions of reasonable amine concentration for $CO_2$ capture and release processes, such as solutions with an AMP concentration of ~3.5M to ~6.0M. The temperature range of about 30° C. to about 60° C. can be beneficial, as no cooling below ambient temperature would be required and, for systems based on aqueous solutions, no boiling of the solvent would be required. Additionally, AMP solutions with a concentration of ~3.5M to ~6.0M can have a viscosity low enough to provide good flow properties. If it is desired to perform the capture process at a temperature above ~60° C., still higher AMP concentrations can be suitable.

As shown in FIG. 1, increasing the temperature of an amine solution (such as AMP) can generally decrease the concentration of the amine that can be retained in solution without forming an equilibrium solid phase, such as a solid phase that results in formation of a slurry. Thus, one way of inducing precipitation in an amine solution loaded with $CO_2$ can be to reduce the temperature of the solution. An additional or alternative way to induce precipitation can be to increase the concentration of amines in the solution (and/or amine-$CO_2$ reaction product), e.g., while maintaining a relatively constant temperature.

Figure 2:
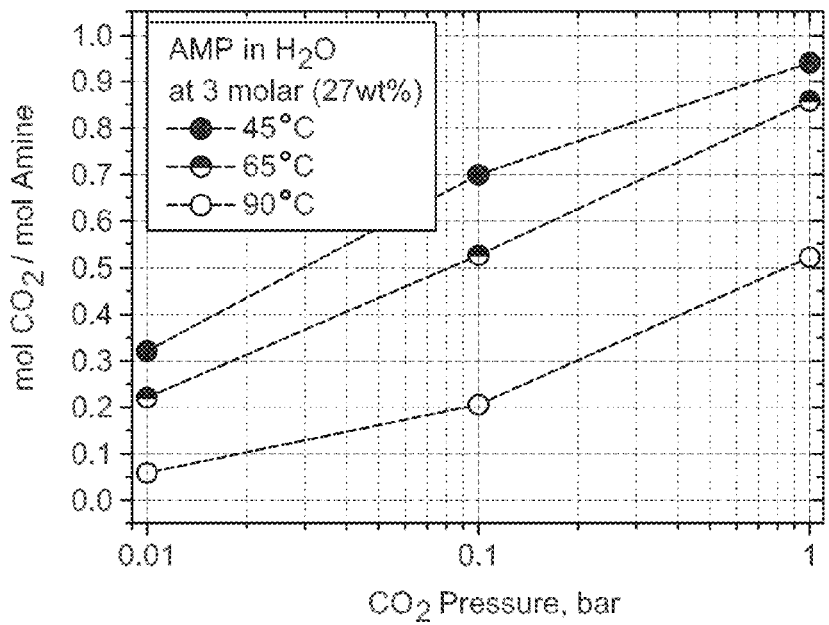
FIG. 2 shows a vapor-liquid equilibrium plot for AMP.

FIG. 2 provides another type of analysis graph for understanding the behavior of hindered amines in solution in relation to the partial pressure of available $CO_2$. Instead of focusing on the solubility of amine-$CO_2$ reaction products, the plot in FIG. 2 shows the vapor-liquid equilibria between dissolved $CO_2$ (liquid) and gas phase $CO_2$ (vapor) for an aqueous amine solution where AMP is the amine. In FIG. 2, the horizontal axis corresponds to the partial pressure of $CO_2$ in the gas phase while the vertical axis represents the ratio of moles of $CO_2$ per mole of amine for a solution. The lines shown in FIG. 2 represent constant temperature lines.

It is noted that the equilibrium values in FIG. 2 appear to be dominated by the contribution of the amine to the amount of $CO_2$ sorption. The equilibrium concentration of $CO_2$ in water at around 25° C. and ~100 kPa of $CO_2$ partial pressure appeared to be about 0.03 M. This value can be smaller at higher temperatures. As shown in FIG. 1, the equilibrium concentration for $CO_2$ in an ~3M solution of AMP at around 45° C. and ~10 kPa partial pressure can be greater than ~3M, which can be approximately 2-3 orders of magnitude greater than the amount of equilibrium sorption due to water. Thus, the amount of $CO_2$ sorbed by an aqueous amine-containing stream can appear to be dominated by the amount of $CO_2$ sorbed by the amine, with the water itself contributing a negligible amount of capacity. (It is noted that the aqueous environment does appear to facilitate capture of $CO_2$ by the amines, as the aqueous environment allows formation of bicarbonate.)

FIG. 2 shows how modifying the temperature can impact the amount of $CO_2$ sorbed in an aqueous amine solution. For typical gases, it is known that the solubility of a gas in aqueous solution typically decreases as the temperature increases. In other words, the partial pressure for a vapor phase gas required to maintain a constant amount of dissolved gas in a solution can typically increase as the temperature increases. Addition of amine compounds can modify this equilibrium, e.g., by allowing additional dissolved $CO_2$ to remain in solution in the form of an amine salt (such as a carbamate, bicarbonate, or carbonate salt). However, as shown in FIG. 2, sorption by amines does not necessarily modify the basic trend that increased temperatures can lead to reduced concentrations in solution of dissolved gases.

For a conventional system where a solution phase (as opposed to a slurry) is maintained throughout a $CO_2$ capture and release (or sorption and desorption) cycle, a plot similar to FIG. 2 can be used to determine the potential working capacity of an amine solution. For example, $CO_2$ can be captured at conditions such as ~0.1 bar (~10 kPa) of $CO_2$ partial pressure at ~45° C. as the solution exits the capture stage. These conditions can roughly correspond to capture of $CO_2$ from a stream with roughly a 10% $CO_2$ content, such as a flue gas. The solution rich in $CO_2$ can then be passed into a regeneration or release stage and heated to a release temperature, such as 90° C. (or possibly a temperature greater than the boiling point of the solvent) in order to release as much of the $CO_2$ as possible. The difference between the $CO_2$ in solution at the capture temperature and the $CO_2$ that remains in solution under the release conditions can represent the working capacity. If the $CO_2$ is released in a vessel with an increased partial pressure of $CO_2$, such as ~1 bar (~100 kPa), the potential working capacity of the solution can correspond to the difference between the data point at ~45° C./~0.1 bar (~10 kPa) and the data point at ~90° C./~1.0 bar (~100 kPa).

The working capacity for a $CO_2$ capture and release system involving precipitation to form a slurry can be markedly different from the working capacity for a pure solution based system. During capture, a vapor-liquid equilibria plot such as FIG. 2 can be used to determine the amount of $CO_2$ that can be captured without causing precipitation.

After the solution exits the capture stage, precipitation can then be induced to form a slurry of precipitated amine-$CO_2$ reaction products. At this point, the equilibria considerations can change in two ways. First, a second equilibrium can become important in the form of the solid-liquid equilibrium for the amine-$CO_2$ reaction products. The solid-liquid equilibrium can dictate how much of the amine-$CO_2$ reaction products precipitate out of solution. Second, due to the precipitation of the amine-$CO_2$ reaction products, the overall amine concentration in the solution can typically decrease. The vapor-liquid equilibria shown in FIG. 2 are based on an assumption of constant amine concentration in solution. As amine is removed from the solution in the form of a precipitate, the concentration of amine can be reduced, resulting in a corresponding decrease in the capacity of the solution to sorb $CO_2$. The correlation between reduced amine concentration and decrease in solution capacity may not be exactly linear, but, unless nearly complete removal of amine occurs due to precipitation, the correlation can be approximated as linear for purposes of this discussion.

In some embodiments, when the amine-$CO_2$ product(s) is (are) precipitated from solution, on the order of ~50 wt % of the amine in solution can be precipitated as part of the reaction product. The exact amount can depend on a variety of factors, such as the amount of sorbed $CO_2$, the conditions used to cause precipitation, or a variety of other factors. For example, the initial amine concentration, the extent of $CO_2$ sorption or loading, the temperature, and the pressure can all influence whether all of the amine-$CO_2$ products in solution will precipitate, or whether only the portions of the amine-$CO_2$ products above the solubility limit will precipitate. Thus, on the order of ~50 wt % can represent precipitation amounts ranging from about 20 wt % to about 80 wt % (or more). Since the amine trapped in the precipitate generally does not contribute to the vapor-liquid equilibria, the percentage of the amine trapped in the precipitate can cause a corresponding percentage decrease in the amount of $CO_2$ that can be sorbed at equilibrium. Thus, precipitation of the amine can result in a decrease of $CO_2$ sorption capacity also on the order of ~50 wt %, such as between about 20 wt % and about 80 wt %. It is noted that, if colder temperatures are used to cause precipitation, the colder temperature can result in an increased equilibrium sorption value for $CO_2$ at a given amine concentration. However, if the temperature reduction is sufficiently small, for example less than about 30° C., the reduction in sorption capacity due to loss of amine in solution due to participation can usually more than overcome any increase in sorption capacity due to reduced temperature.

After precipitation, the precipitated solids can be separated from a majority of the solvent. This separation can effectively "lock in" the reduced $CO_2$ content in the majority of the solvent, by preventing the amines and/or $CO_2$ in the precipitate from rejoining the majority of the solvent. As a result, at least a portion of the working capacity can be based on the difference in sorbed $CO_2$ between the capture stage and the separated majority of solvent.

The remaining part of the working capacity can be determined based on the amount of $CO_2$ that remains sorbed in the amine solution after regeneration or release of $CO_2$. Separation of the precipitate can result in a slurry with an increased solids concentration. This slurry with increased solids concentration can then be passed into one or more regeneration stages. In the regeneration stage(s), the slurry can be exposed to reduced pressures, increased temperatures, stripping gases, or a combination thereof. After release of the $CO_2$, an aqueous amine solution with an increased amine content can remain behind. Any $CO_2$ present in the concentrated amine solution can also be recycled, and therefore can also help to define the potential working capacity for the $CO_2$ capture and release system.

Solvent

The concentration of the amine in aqueous solution may be adjusted, e.g., to maintain the desired viscosity as needed, particularly for the rich solution containing the sorbed $CO_2$. In some preferred embodiments, the solvent can be water. Alternatively, a beneficial effect may be obtained by the use of a co-solvent with water, such as a polar, aprotic co-solvent. A polar co-solvent with the water may result in enhanced solvation of the reaction products, as compared to water alone or water with a co-solvent of lower polarity. For an amine/solvent combination that precipitates at a relatively low concentration under desired capture conditions (such as AMP in water), addition of a polar solvent could allow for higher solvent phase AMP concentrations at temperatures near ~30° C., which could increase the working capacity by allowing for greater $CO_2$ sorption prior to precipitation. A polar solvent can additionally or alternatively increase the sorption of $CO_2$ by amines in solution, thereby facilitating increased loading/capacity of the sorbent. Purely non-aqueous polar solvents would be expected to be less corrosive, enabling the use of cheaper metallurgies, e.g., carbon steel, with reduced concern about corrosion, e.g., at higher loadings. Additionally or alternatively, a non-ionic co-solvent can decrease the solubility of the ionic reaction products (i.e., bicarbonates and carbamates) generated during $CO_2$ sorption by an amine.

Preferred co-solvents can advantageously have a relatively high boiling point, e.g., at least about 65° C., preferably about 70° C. or higher, in order to enable reduced solvent losses in the process. Furthermore, higher boiling points can be desirable in some embodiments, depending on the regeneration conditions to be used. Use of higher boiling point solvents can conserve valuable energy that would otherwise be consumed in vaporization of the solvent.

Hindered amine systems can preferably be used in aqueous solution but may additionally or alternatively be admixed with polar organic (co-)solvents. Suitable (co-)solvents can include, but are not limited to, lower alkanols with boiling points above ~100° C.; ketones such as methyl ethyl ketone (MEK), methyl butyl ketone (MBK), methyl isobutyl ketone (MIBK), and the like; dimethylsulfoxide (DMSO); N-methylpyrrolidone (NMP); N,N-dimethylformamide (DMF); N,N-dimethylacetamide (DMAc); sulfolane (tetramethylene sulfone); hexamethylphosphoramide (HMPA); tetrahydrofuran (THF); acetonitrile; propylene carbonate; dimethyl ethers of ethylene and/or propylene glycols; esters such as ethyl acetate and/or amyl acetate; halocarbons such as 1,2-dichlororobenzene (ODCB); and combinations thereof.

Once the liquid sorbent medium has been formulated with hindered amine and the (co-)solvent/medium, optionally with ingredients such as antioxidants, corrosion inhibitors, and the like, it can be employed, for example, in a liquid process cyclic sorption unit, as described herein.

Process Configuration

The separation process can be carried out, e.g., in a conventional manner, where the separation can be based on the reaction between the gas mixture and a solution of the amine sorbent. This solution can circulate in a continuous closed cycle circulating between a sorption zone and a regeneration zone, with both zones conventionally in the form of columns or towers. In the sorption zone, the incoming gas stream can normally be passed in a tower countercurrent to a descending stream of liquid sorbent solution at a relatively low temperature, e.g., from about 20° C. to about 80° C., from about 25° C. to about 80° C., or from about 40° C. to about 45° C. After reaction with $CO_2$, the amine solution (the rich stream) containing the separated $CO_2$, in the form of the $CO_2$/amine reaction product, can then pass to a regeneration section. In the regeneration tower, the sorbent solution can be regenerated by separating the sorbed $CO_2$ by a change in conditions under which desorption is favored, typically by change in temperature (usually an increase), pressure, or a combination thereof. In certain embodiments, an intermediate heat exchanger upstream of the regenerator tower may be used to flash off $CO_2$ from the less thermally stable bicarbonate product at lower temperature (but typically higher than the sorber temperature), thereby reducing the load on the regenerator, e.g., mainly due to the decomposition of carbamate product at a higher temperature. Gas stripping may be used to raise the temperature and/or decrease the partial pressure of the $CO_2$ to favor desorption. The regenerated amine solution (the lean stream) may then be recirculated to the sorption tower after cooling if necessary or desired. The desorbed $CO_2$ from the regeneration zone may be compressed and/or liquefied for transport to a sub-surface storage (i.e., sequestration) or for utilization, e.g., for $CO_2$ Enhanced Oil or Gas Recovery or for use as a feedstock in chemical manufacture.

The above type of system can also be adapted for use in a capture/release system where a precipitate can be formed after $CO_2$ capture. Optionally but preferably, the concentration of the amine (or amines) in the amine solution can be relatively close to the concentration for precipitation of amine-$CO_2$ reaction products at the temperature and pressure in the capture stage or zone. For example, the amine concentration can be selected so that, at the $CO_2$ partial pressure in the capture zone, the capture temperature can be less than about 20° C. greater than the temperature at which precipitation occurs, e.g., less than about 15° C. greater than the precipitation temperature. The $CO_2$ partial pressure in the capture zone can be related to the concentration of $CO_2$ in the gas phase stream input to the capture zone.

More generally, the stability of the $CO_2$/amine species can generally decrease with increasing temperature, so that sorption of the $CO_2$ can be favored by lower temperatures, but, with operation with flue gas, the temperature can typically be higher, unless the incoming gas stream is initially cooled. With natural gas streams, the temperature can often be lower, particularly if the gas has been passed through an expansion before entering the scrubbing unit. The sorption temperature can typically be at least about 10° C. (e.g., at least about 15° C., at least about 20° C., at least about 25° C., at least about 30° C., at least about 35° C., at least about 40° C., at least about 45° C., at least about 50° C., at least about 55° C., at least about 60° C., at least about 65° C., at least about 70° C., at least about 75° C., or at least about 80° C.) and/or at most about 90° C. (e.g., at most about 85° C., at most about 80° C., at most about 75° C., at most about 70° C., at most about 65° C., at most about 60° C., at most about 55° C., at most about 50° C., at most about 45° C., or at most about 40° C.). Depending on the embodiment, the temperature during a capture or sorption stage can be related to the concentration of the amine being used for $CO_2$ capture, so that the amine-$CO_2$ reaction products can remain in solution during the capture stage while still allowing for precipitation with a modest change in temperature (or another condition). Temperatures below about 50° C. are likely to be favored for optimal sorption, if capable of attainment at relatively low incremental cost and/or if the incoming gas stream is already at such a temperature; these lower sorption temperatures can be routinely obtainable using a variety of well-known gas stream cooling methods, such as direct contact of a $CO_2$-containing gas stream with a chilled water spray or an air cooler.

After the capture zone, the $CO_2$-rich amine solution can be passed into a precipitation stage. Any convenient method can be used for causing precipitation of amine-$CO_2$ reaction products in the precipitation zone. One option for causing precipitation can be to cool the rich amine solution to a sufficiently cold temperature to cause precipitation. Depending on the exit temperature of the rich solution from the capture zone, the cooling can be performed using a chiller unit, a heat exchanger, or another convenient method for cooling a liquid flow. It is noted that the method for cooling the rich amine solution should also be compatible with the presence of the solid particles generated by precipitation. As an example, an ~4M solution of AMP at a $CO_2$ partial pressure of about 0.1 bar (about 10 kPa) can be at equilibrium at a temperature of about 50° C. By contrast, precipitation will occur if the solution is chilled to a temperature below about 40° C. or lower, such as about 30° C. or lower. Optionally, formation of a precipitate can be further facilitated by addition of seed crystals during the precipitation stage, such as addition of seed crystals composed of the corresponding amine-$CO_2$ salt.

Another way to induce precipitation can be to increase the $CO_2$ loading (partial pressure) for the solution. In this option, the rich amine solution can be passed into a stage with a sufficiently higher partial pressure of $CO_2$ so that precipitation can occur. One source for the $CO_2$ used to oversaturate the solution can be to recycle at least a portion of the $CO_2$ generated during the release stage. Optionally, the cooling and oversaturation methods can be used together in a single stage for causing precipitation.

Still another way to cause precipitation can be to increase the amine concentration, such as by removing water from the solution. This can be accomplished using a membrane separation process, such as a reverse osmosis membrane process, a vibrating membrane process, a pervaporation membrane process, a process using a molecular sieve separator, or a combination thereof. The molecular sieves could then be regenerated using hot flue gas or air going into a boiler/furnace/turbine.

Yet another option to induce phase separation with a traditional absorber system could be to pump the rich amine solution through a bed of solid particles in order to pull out the bicarbonate species (i.e., the amine-$CO_2$ reaction products). These solids could then be regenerated separately.

After precipitation, the amine-$CO_2$ precipitate slurry can be separated, e.g., to remove at least a portion of the water from the precipitate slurry. This can result in generation of an amine solution lean in $CO_2$ content and a concentrated precipitate slurry. The separation to form a lean amine solution and concentrated precipitate slurry can be performed in any convenient manner. One option can be to use a cyclone separator or another type of density based separator. Another option can be to perform a membrane type separation with a membrane pore size sufficiently smaller than the average particle size of the precipitate particles. The lean amine solution can be recycled for use in additional $CO_2$ capture. The concentrated precipitate slurry can be passed into one or more stages for $CO_2$ release.

During the $CO_2$ release or regeneration stage(s), the concentrated precipitate slurry can be exposed to increased temperatures and/or modified temperatures in order to separate the $CO_2$ from the amine. Depending on the embodiment, one or more regeneration stages or zones may be involved in regeneration. For example, a regeneration tower can be used for separation of the $CO_2$ in the precipitated amine-$CO_2$ solids by a change in conditions under which desorption is favored, typically by change in temperature (usually an increase), pressure, or a combination thereof. In a preferred embodiment, an intermediate heat exchanger upstream of the regenerator tower may be used to flash off $CO_2$ from the precipitated product and/or from remaining dissolved amine-$CO_2$ product at a lower temperature (but higher than the sorber temperature), thereby reducing the load on the regenerator. After either the flash separation and/or a regeneration tower, a higher temperature regeneration zone may be included to desorb any $CO_2$ that was sorbed in the form of carbamate. Such a higher temperature regeneration zone can include a regeneration temperature of at least about 100° C., such as at least 120° C. Gas stripping may be used to raise the temperature and/or decrease the partial pressure of the $CO_2$ to favor desorption. The regenerated amine solution (the lean stream) may then be recirculated to the sorption tower after cooling if necessary. The desorbed $CO_2$ from the regeneration zone may be compressed and/or liquefied for transport to a sub-surface storage (i.e., sequestration) or for utilization, e.g., for $CO_2$ Enhanced Oil or Gas Recovery or for use as a feedstock in chemical manufacture.

Desorption temperatures can be dependent on the selected system, e.g. amine and/or $CO_2$ concentration, and can typically be at least about 10° C. above, e.g., at least about 15° C. above or at least about 20° C. above, the temperature in the sorption zone. Preferably, due to the concentrated nature of the precipitate slurry, release of the captured $CO_2$ can often be performed at temperatures below the boiling point of water (or another solvent), e.g., a release temperature of about 95° C. or less, about 75° C. or less, about 60° C. or less, or about 50° C. or less. One option can be thermal desorption, where a rich solution can be passed through a hot bath with a head space at controlled pressure (typically about ~1.0 bar, or ~100 kPa). Pressure control can be effected by removal of the desorbed gas at an appropriate rate. If multiple regeneration stages are present, each regeneration stage can have a different temperature, such as an increasing temperature in each successive regeneration stage.

A slip stream of the previously separated $CO_2$ may additionally or alternatively be used for stripping, although the concentration of residual $CO_2$ in the lean sorbent stream returning to the sorption tower may be higher, and compensation to lower the $CO_2$ partial pressure in the tower can be required to facilitate carbamate decomposition. The reduction in the $CO_2$ partial pressure from gas stripping can promote desorption of the gas, and, when this expedient is used, there may be no requirement for a significant pressure reduction, although the pressure may be reduced for optimal stripping, suitably to the levels used in pressure swing operation. Stripping with mixtures of an inert (non-reactive) gas and hot $CO_2$ may be effective. When carrying out the desorption by inert gas sparging and/or pressure swing operation, the temperature may be maintained at a value at or close to that used in the sorption step, although desorption can be favored by an increase in temperature from the sorption zone to the regeneration zone, either with or without stripping or a decrease in pressure. When stripping with previously separated $CO_2$, desorption of the $CO_2$ from the rich solution stream can be favored by heating the $CO_2$ stripping gas.

After release of $CO_2$, the lean amine solution from the physical slurry separation and the $CO_2$ release stage can be recycled for use in the $CO_2$ capture stage. If necessary, the temperature of the recycled amine solution can be adjusted prior to return to the capture stage.

Figure 6:
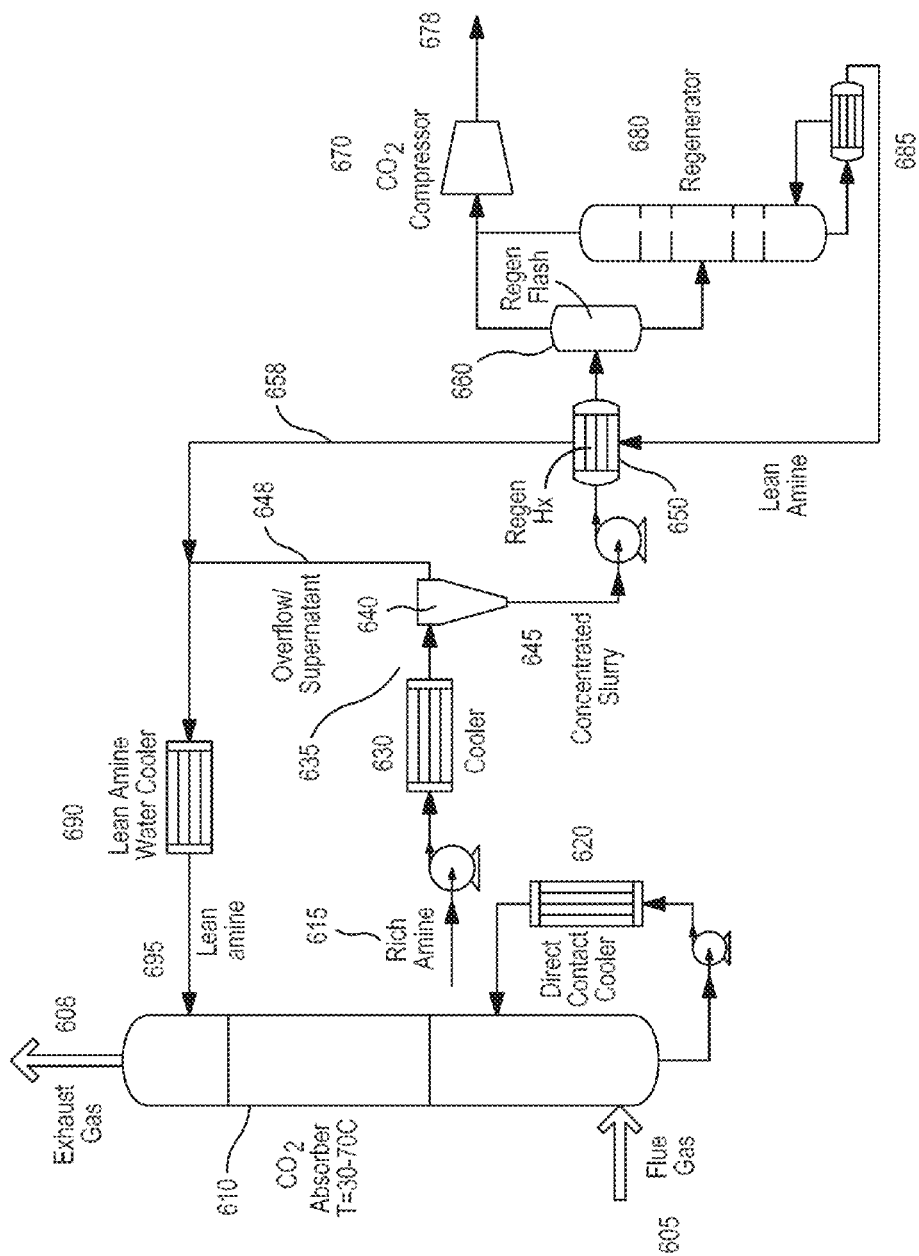
FIG. 6 shows an example of a processing system suitable for performing an embodiment of the invention.

FIG. 6 shows an example of a reaction system suitable for performing $CO_2$ capture and release according to an embodiment of the invention. In FIG. 6, a flue gas 605 containing $CO_2$ can be passed into an absorber 610 for contact with an amine solution 695. The conditions in absorber 610 can be maintained at a temperature so that precipitated reaction products are not formed in the absorber. A direct contact cooler 620 can be used to cool the flue gas 605 prior to contacting the amine solution 695. The flue gas can then be contacted with the amine solution 695 to form a rich amine solution 615 enriched in $CO_2$. After optionally increasing the pressure of the solution, the enriched amine solution can be exposed to conditions that induce precipitation, such as cooling 630 the solution. This can result in precipitation of amine-$CO_2$ products to form a precipitate slurry 635. The precipitate slurry 635 can then be separated, such as by using one or more cyclone separators 640, to form a concentrated slurry 645 and an overflow stream 648. The overflow stream 648 can correspond to an amine-containing solution depleted in amine content. The concentrated slurry 645 can contain the majority, and/or substantially all, of the precipitate from the precipitate slurry 635. The concentrated slurry can then be passed through a slurry/slurry heat exchanger 650 to increase the temperature of the concentrated slurry prior to regeneration. A portion of the $CO_2$ can be removed from the slurry in a flash separator 660 and passed to a compressor 670 to form an output $CO_2$ stream 678. The remaining slurry can then be passed into regeneration tower 680 for release of additional $CO_2$ to regenerate the amine solution portion of the concentrated slurry. The $CO_2$ released in regeneration tower 680 can also be passed to compressor 670 to form output $CO_2$ stream 678. The remaining amine solution portion 685 can be passed through slurry/slurry heat exchanger 650 to cool the remaining amine solution portion 685. The cooled remaining amine solution 685 and overflow stream 648 can be combined and further cooled 690 to form amine stream 695.

Other Options for Causing Precipitation

Still another option using the phase separation behavior of the amine products can be to form a slurry in the capture zone, such as by bubbling $CO_2$ up through a vessel filled with liquid amine. The key economic consideration for this option can be the pressure required to overcome the static head of the liquid in the vessel. About 1 psig (about 7 kPag) can be equivalent to ~2.3 feet of water. For a pressure drop of ~2 psig (~15 kPag) from a single blower fan, the amine height would be limited to about 4 feet. This can likely be insufficient to achieve a ~90% capture rate. Additional blower fans could be installed to boost the pressure. It is possible in this liquid continuous reactor, that the distributor/DCC could be eliminated, thus offsetting a portion of the additional costs of flue gas pressure. In this type of arrangement, a tower design can be selected to be compatible with handling a slurry flow of precipitate particles.

Yet another option to use the phase separation behavior can be to use a spray tower design. This type of option can involve a gas continuous arrangement with liquid droplets of amine being sprayed into the $CO_2$-containing gas, so that pressure drop can be reduced and/or minimized. The tower can either be a traditional vertical spray tower, or a horizontal "tower", which may be advantageous if the vertical tower would need to be prohibitively tall.

Additional Embodiments

Additionally or alternatively, the present invention can include one or more of the following embodiments.

Embodiment 1

A method for separating carbon dioxide from a gas stream, comprising: contacting a gas stream containing $CO_2$ in a sorption zone with a sorption solution comprising a promoter amine and at least one of a sterically hindered amine and a tertiary amine, the sorption solution having a total amine concentration of at least about 3.0 M, at a temperature of at least 10° C. to sorb at least a portion of the $CO_2$ into the sorption solution and form a rich stream of the sorbed $CO_2$ in the sorption solution comprising one or more amine-$CO_2$ reaction products dissolved in the solution; passing the rich stream from the sorption zone to a second zone and precipitating at least a portion of the amine-$CO_2$ reaction products to form a precipitate slurry; separating the precipitate slurry to form a portion enriched in precipitate solids and a first recycle stream, the first recycle stream comprising a majority of the solvent from the precipitate slurry; and passing the portion enriched in precipitate solids to at least one regeneration zone and desorbing the sorbed carbon dioxide as gas to form a second recycle stream, the second recycle stream containing a lower concentration of carbon dioxide than the rich stream and containing an increased concentration of total amine relative to the rich stream, wherein the aqueous sorption solution comprises at least a portion of the first recycle stream and at least a portion of the second recycle stream.

Embodiment 2

A method for separating carbon dioxide from a gas stream, comprising: contacting a gas stream containing carbon dioxide in a sorption zone with an aqueous sorption solution comprising a promoter amine and a sterically hindered amine, the sorption solution having a total amine concentration of at least about 3.0 M, at a temperature of at least 10° C. to sorb at least a portion of the carbon dioxide into the sorption solution and form a rich stream of the sorbed carbon dioxide in the sorption solution comprising amine-carbon dioxide reaction products dissolved in the solution; passing the rich stream from the sorption zone to one or more regeneration zones and desorbing the sorbed carbon dioxide as gas to form a recycle stream, the recycle stream containing a lower concentration of carbon dioxide than the rich stream and containing an increased concentration of amine relative to the rich stream, the aqueous sorption solution comprising at least a portion of the recycle stream, wherein the promoter amine is a non-hindered primary or secondary amine, an alkanolamine, an aminoether, or a cyclic or acyclic tertiary amine, the sterically hindered amine preferably comprising an aminoalkanol, an aminoether, or a difunctional amine.

Embodiment 3

A method for separating carbon dioxide from a gas stream, comprising: contacting a gas stream containing carbon dioxide in a sorption zone with an aqueous sorption solution comprising a promoter amine and a tertiary amine, the sorption solution having a total amine concentration of at least about 3.0 M, at a temperature of at least 10° C. to sorb at least a portion of the carbon dioxide into the sorption solution and form a rich stream of the sorbed carbon dioxide in the sorption solution comprising amine-carbon dioxide reaction products dissolved in the solution; passing the rich stream from the sorption zone to one or more regeneration zones and desorbing the sorbed carbon dioxide as gas to form a recycle stream, the recycle stream containing a lower concentration of carbon dioxide than the rich stream and containing an increased concentration of amine relative to the rich stream, the aqueous sorption solution comprising at least a portion of the recycle stream, wherein the sorption solution comprises 9 wt % or less of the promoter amine, the tertiary amine comprising an aminoalkanol, an aminoether, or a difunctional amine.

Embodiment 4

A method for separating carbon dioxide from a gas stream, comprising: contacting a gas stream containing carbon dioxide in a sorption zone with an aqueous sorption solution comprising a promoter amine and a second amine, the second amine being present in a greater amount than the promoter amine, the sorption solution having a total amine concentration of at least about 3.0 M, at a temperature of at least 10° C. to sorb at least a portion of the carbon dioxide into the sorption solution and form a rich stream of the sorbed carbon dioxide in the sorption solution comprising amine-carbon dioxide reaction products dissolved in the solution; passing the rich stream from the sorption zone to one or more regeneration zones and desorbing the sorbed carbon dioxide as gas to form a recycle stream, the recycle stream containing a lower concentration of carbon dioxide than the rich stream and containing an increased concentration of amine relative to the rich stream, the aqueous sorption solution comprising at least a portion of the recycle stream, wherein the promoter amine is a non-hindered primary or secondary amine, an alkanolamine, an aminoether, or a cyclic or acyclic tertiary amine.

Embodiment 5

The method of any one of the previous embodiments, wherein the sterically hindered amine comprises MAMP, an alkyl ether of AMP, or an alkyl ether of MAMP, and/or wherein the tertiary amine comprises DMAE or an alkyl ether of DMAE.

Embodiment 6

The method of any one of the previous embodiments, wherein the total sterically hindered amine concentration or the total tertiary amine concentration in the sorption solution is at least about 2.5 M, e.g., from about 5.0 M to about 8.0 M, and/or wherein the promoter amine concentration in the amine solution is from 0.1 M to about 1.5 M.

Embodiment 7

The method of any one of the previous embodiments, wherein the $CO_2$ is contacted with the amine solution in the sorption zone at a temperature of about 25° C. to about 45° C.

Embodiment 8

The method of any one of the previous embodiments, wherein the rich stream has a $CO_2$ loading of at least 0.4 mol $CO_2$ per mol of amine, and/or wherein the rich stream has a viscosity of about 10 cP or less.

Embodiment 9

The method of any one of the previous embodiments, wherein the $CO_2$ is contacted with the amine solution in the sorption zone at a carbon dioxide partial pressure of at least about 0.025 bar (about 2.5 kPa).

Embodiment 10

The method of any one of the previous embodiments, wherein the sorbed $CO_2$ is desorbed from the rich stream in at least one regeneration zone at a temperature higher than the temperature of the sorption zone, the sorbed $CO_2$ preferably being desorbed from the rich amine stream in a regeneration zone(s) at a temperature of 95° C. or less, at a temperature of at least about 100° C. (such as at least about 120° C.), or a combination thereof.

Embodiment 11

The method of any one of the previous embodiments, wherein the at least one regeneration zone comprises a flash desorption regeneration zone.

Embodiment 12

The method of any one of the previous embodiments, which comprise a precipitate slurry, wherein at least 70 wt % (e.g., at least 75 wt %) of the precipitate solids comprise a bicarbonate salt, and/or wherein the $CO_2$-containing gas stream is contacted with the sorption solution at a temperature that is greater than a temperature in the precipitation zone by about 20° C. or less.

Embodiment 13

The method of any one of the previous embodiments, wherein the sorption solution comprises an aqueous sorption solution, a non-aqueous sorption solution, or a combination thereof.

Embodiment 14

The method of any one of the previous embodiments, wherein the concentration of the promoter amine in the sorption solution is about 9 wt % or less, such as about 5 wt % or less.

Embodiment 15

The method of any one of the previous embodiments, wherein the promoter amine comprises a derivative of piperazine or piperidine that includes at least one tertiary amine, such as a bridged derivative of piperazine or piperidine.

EXAMPLES

Example 1

Impact of Promoter Amines on $CO_2$ Uptake Rates

Figure 3:
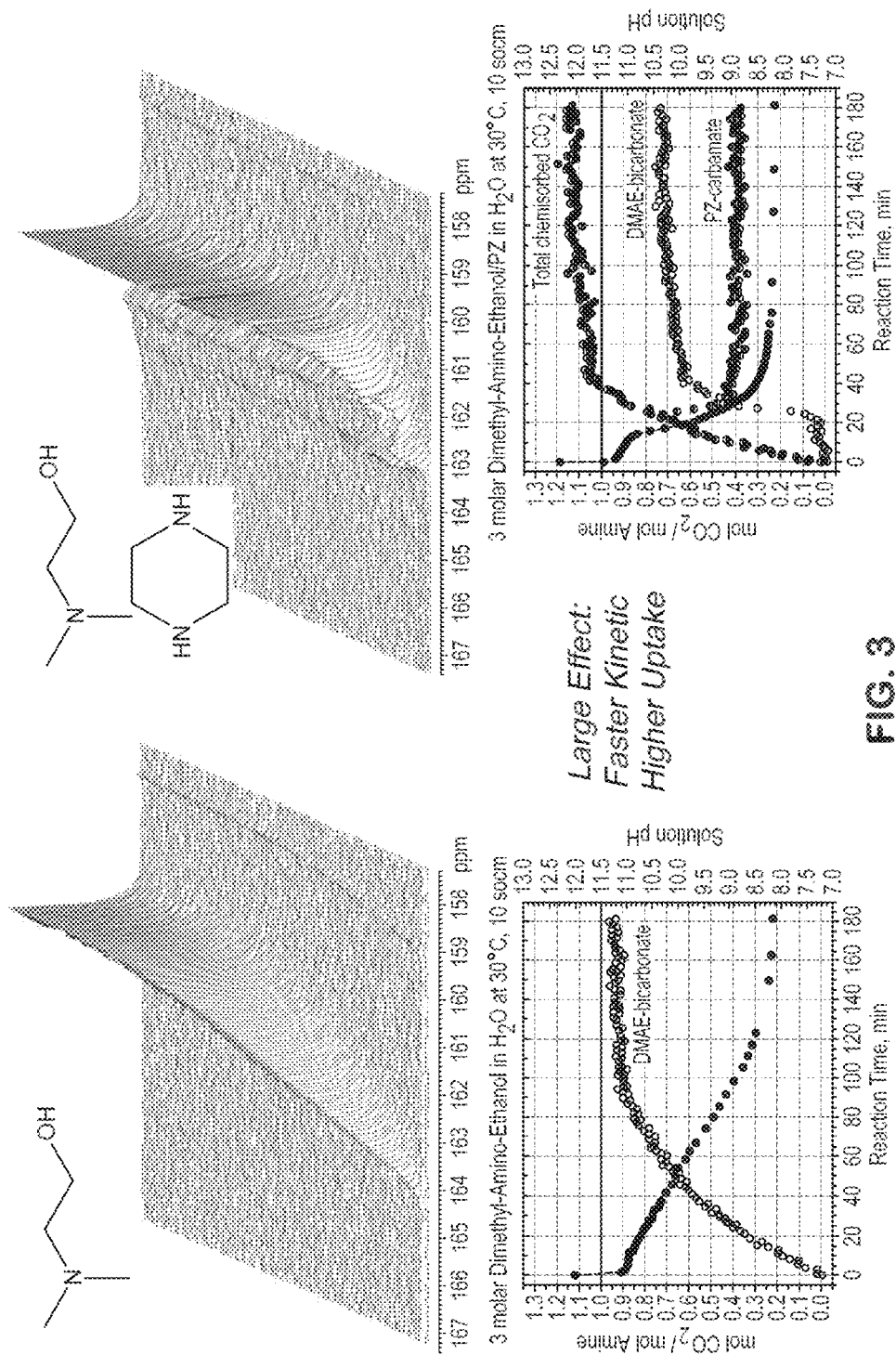
FIG. 3 shows various plots related to $CO_2$ uptake by the tertiary amine dimethylaminoethanol (DMAE) and promoted DMAE.

FIG. 3 shows an example of the benefits of using a promoter amine for a tertiary amine system. In FIG. 3, the left hand portion of the figure corresponds to results from passing a $CO_2$ containing gas stream through an aqueous solution of ~3M dimethylaminoethanol (DMAE, a tertiary amine) at ~10 cm³/min. The right hand portion of the Figure corresponds to a solution that includes ~3M DMAE as well as ~1M piperazine as a promoter. The upper left and upper right plots show the evolution over time for a $^{13}C$ NMR plot focused on the region for carbon atoms that participate in the formation of bicarbonate and carbamate salts. The $^{13}C$ NMR plots show that the tertiary amine by itself appeared to lead only to formation of a bicarbonate, while the combination of the tertiary amine with a promoter (top right) appeared to result in formation of both an intermediary carbamate as well as the bicarbonate. While the carbamate signal in the right-hand $^{13}C$ NMR plot initially grew, the carbamate signal quickly plateaued, which appeared to indicate an equilibrium between creation of additional carbamate salts and transfer of carbon dioxide from the promoter carbamate to the DMAE as bicarbonate. The lower left and lower right plots in FIG. 3 show the rate of formation for aqueous DMAE-bicarbonate or DMAE-carbamate salts in the absence or presence a promoter. Without a promoter (lower left), at least 60 minutes appear to be required for the DMAE to reach ~80% of its capacity for absorbing $CO_2$, with substantially all of the capacity appearing to correspond to formation of bicarbonate salts. By contrast, with a promoter (lower right) the DMAE appears to sorbs over ~80% of its sorption capacity in ~40 minutes. Additionally, the piperazine promoter also appears to be successful in sorbing $CO_2$, further enhancing the amount of $CO_2$ sorbed within the ~40 minutes.

Figure 4:
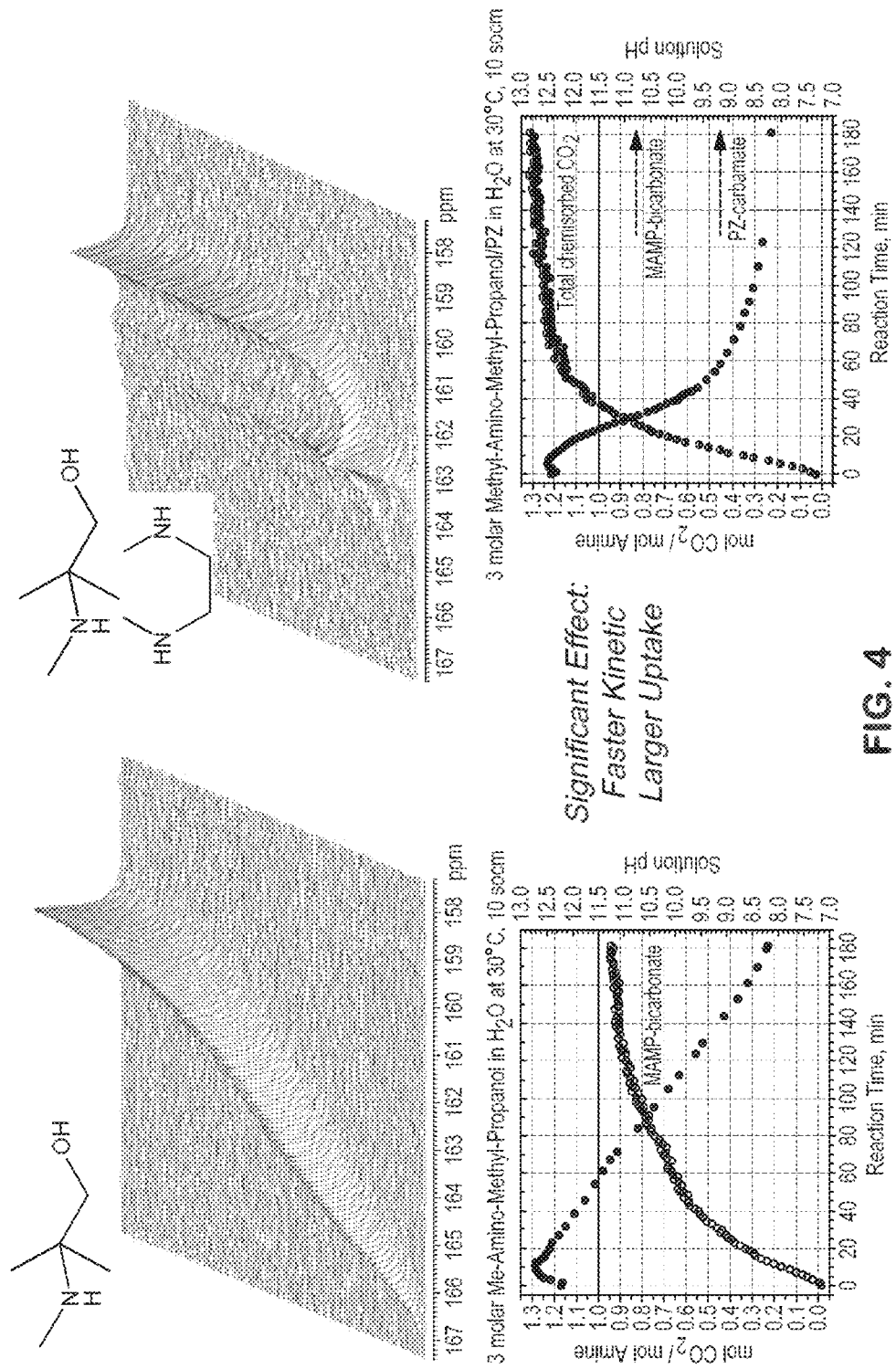
FIG. 4 shows various plots related to $CO_2$ uptake by the hindered secondary amine 2-(methylamino)-2-methyl-1-propanol (MAMP) and promoted MAMP.

FIG. 4 shows similar plots for an ~3M solution of methylaminomethylpropanol (MAMP, a secondary hindered amine). The left hand plots show results without a promoter amine, while the right hand plots include ~1M piperazine as a promoter. Similar to FIG. 3, because MAMP is a secondary hindered amine, only a bicarbonate salt appeared to be formed by MAMP alone. With the addition of ~1M piperazine, a carbamate phase also appeared to form, which appeared to enable faster uptake of $CO_2$. By itself, MAMP appeared to require about 80 minutes to reach ~80% of maximum $CO_2$ uptake. With a promoter, the MAMP appeared to reach ~80% of maximum $CO_2$ uptake in about 60 minutes.

The following reaction scheme shows an example of how piperazine may act as a promoter for MAMP. Initially, the potential reactants of MAMP and piperazine are represented as separate. The higher activity nitrogen in the piperazine can react with a $CO_2$ molecule to form a carbamate. The charge on the carbamate can be balanced by the amine accepting a positive charge in the form of a proton. Water can then attack the carbamate to form a bicarbonate ion, thus producing the bicarbonate salt of MAMP.

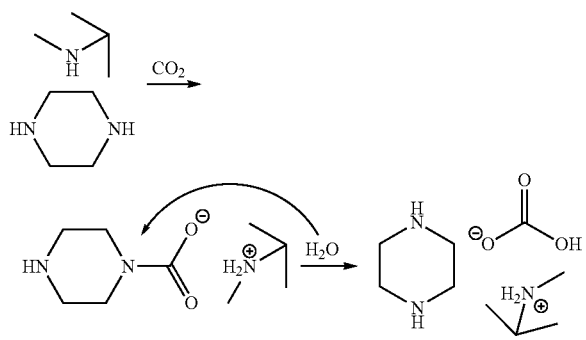

Figure 5:
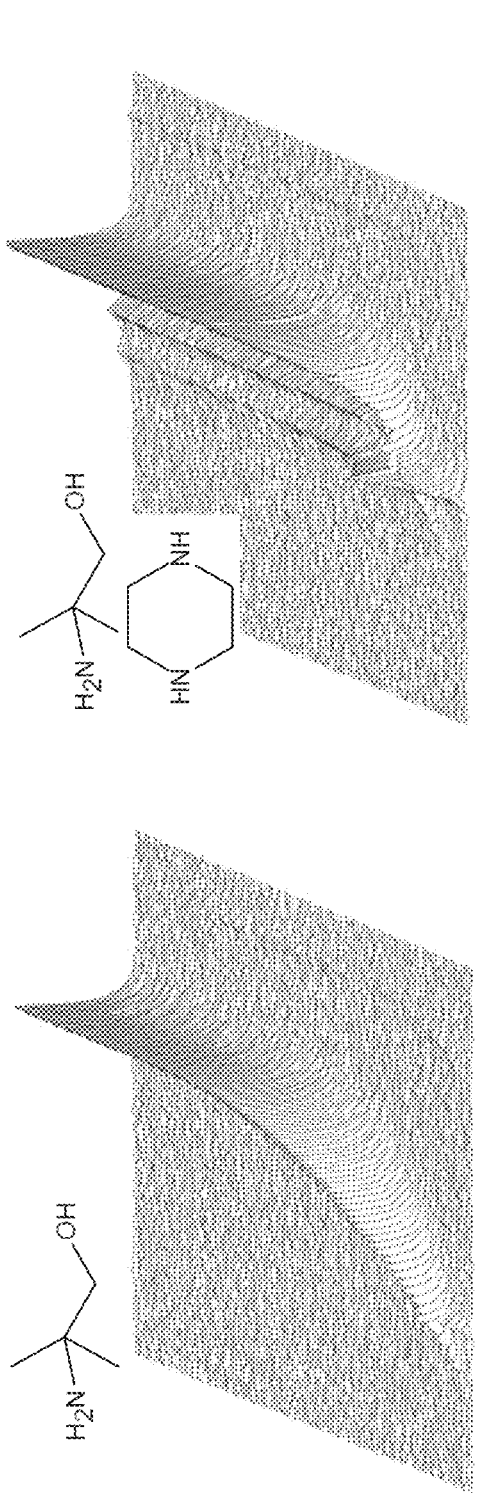
FIG. 5 shows various plots related to $CO_2$ uptake by the hindered primary amine 2-amino-2-methyl-1-propanol (AMP) and promoted AMP.
Figure 5:
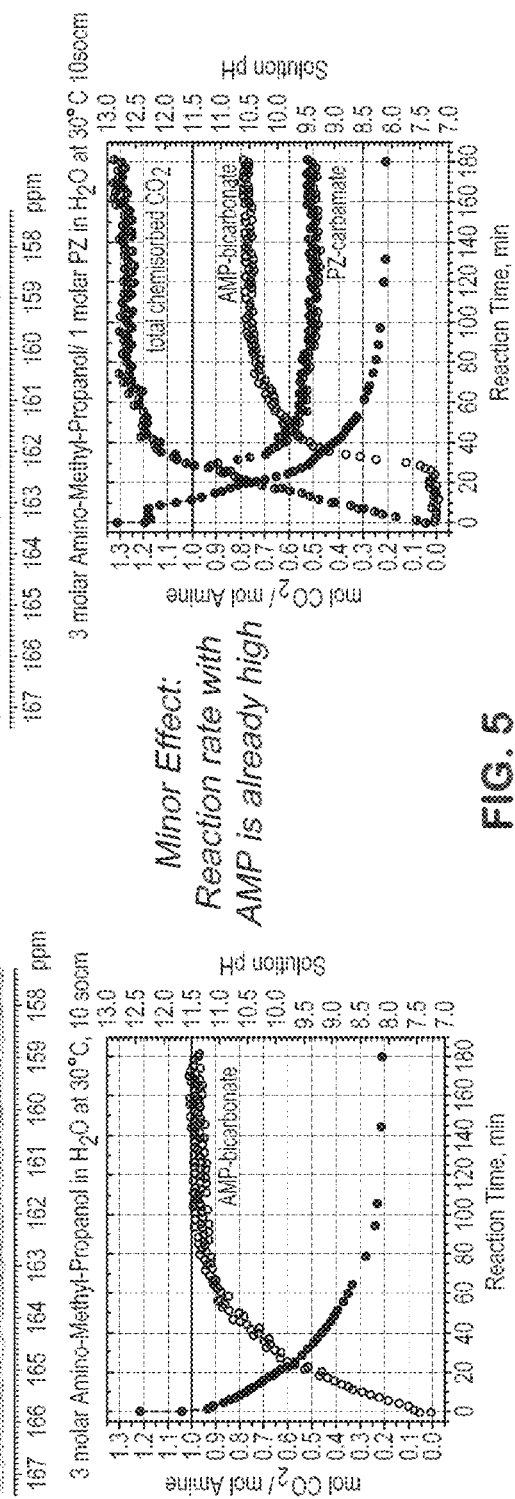

FIG. 5 shows similar plots for an ~3M solution of aminomethylpropanol (AMP, primary hindered amine). The left hand plots show results without a promoter amine, while the right hand plots include ~1M piperazine as a promoter. The lower left and right plots in FIG. 5 show that, for an ~3M solution of AMP, the direct formation of the bicarbonate phase appeared to be fast enough to be similar to the reaction rate for a promoted amine pathway. Even though carbamate formation was not observed for AMP alone, AMP without a promoter was observed to reach about 80% of the available absorption capacity in about 45 minutes, as opposed to just under 40 minutes with a promoter. While there can be some impact from addition of a promoter on primary hindered amines, it may not be as pronounced as the benefit for the secondary hindered amines and/or tertiary amines.

Example 2

Slurry Formation for ~70 wt % TMG in $D_2O$ $^{13}C$ NMR was used to characterize uptake of $CO_2$ by an amine in a deuterium oxide solution. An ~70 wt % solution of 1,1,3,3-tetramethylguanidine (TMG) was prepared in $D_2O$ in an about 10 mm NMR tube fitted with a plastic cap and capillary dip tube. The NMR tube was placed inside an ~10 mm wide-bore Bruker Advance 400 MHz NMR spectrometer with a BBO probe. After initial characterization, the TMG solution was heated to about 90° C. and $CO_2$-containing gas (about 10% $CO_2$/90% $N_2$ by volume) was bubbled (about 10 cm$^3$/min, measured by a Brooks 5896 flow controller) through the solution for approximately 6 hours until no further $CO_2$ uptake was observed by NMR. Although 1,1,3,3-tetramethylguanidine includes multiple amine groups, they are each believed to qualify as a sterically hindered amine, based on the number of protons on an alpha carbon atom.

Figure 7:
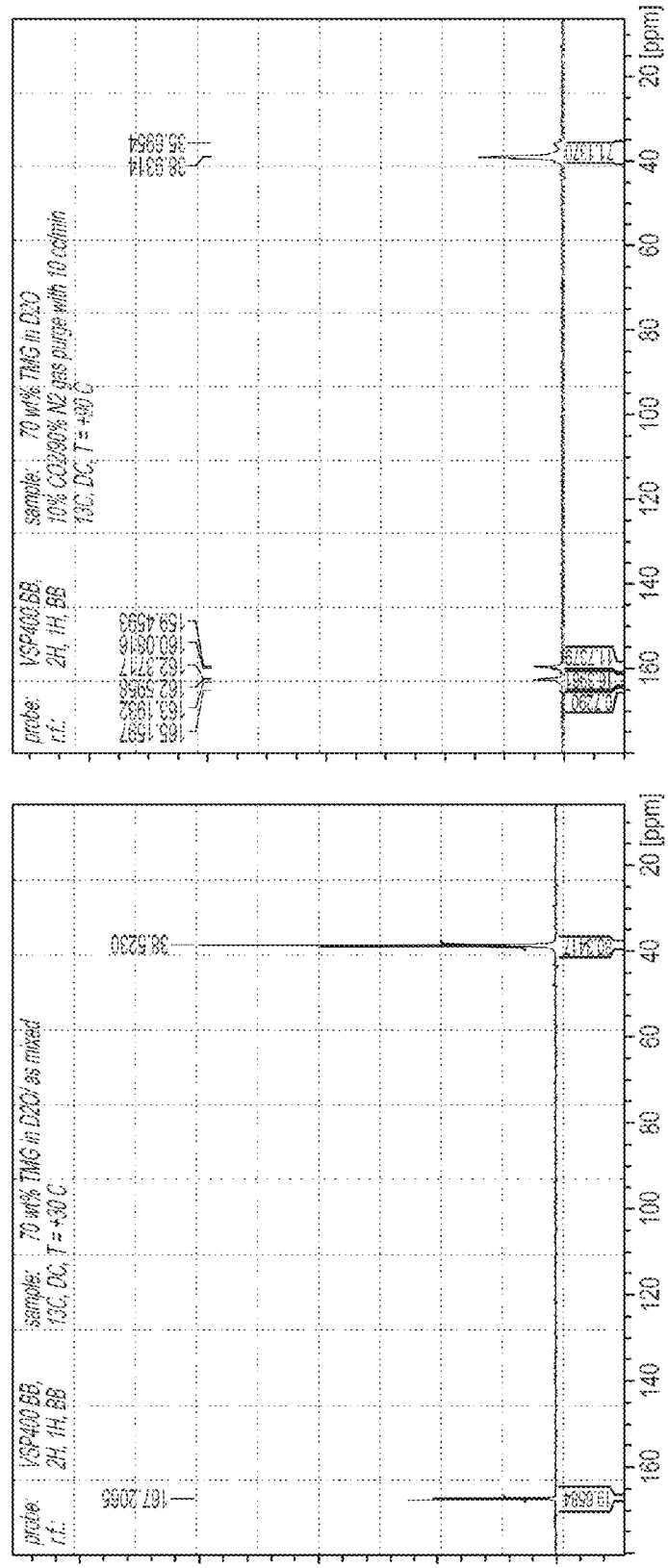
FIG. 7 shows $^{13}C$-NMR spectra of ~70 wt % tetramethylguanidine (TMG) in $D_2O$ before and after treatment with $CO_2$ at ~90° C.

As shown in FIG. 7, the initial NMR spectrum of the starting material appeared to change upon $CO_2$ addition, indicating the formation of bicarbonate product (>C=0 resonance at ~159.4 ppm). The protonation of the guanidine to guanidinium can be confirmed by the shift of the >C=N resonance at ~167.2 ppm upfield to ~162.3 ppm. Detailed analysis of initial and reacted TMG signals appeared to show significant loss of TMG liquid phase signal—only ~43.9 mol % of TMG was observed to remain in the solution after reaction with $CO_2/N_2$ mixture. Another ~56.1 mol % of TMG molecules appeared to precipitate from solution (and thus did not appear to result in a liquid signal) after reaction with $CO_2$ into a white slurry, which was confirmed visually. Based on integration of the liquid phase products (FIG. 7, peak at ~159.4 ppm versus the >C=N peak of guanidine at ~162.6 ppm), ~31.3 mol % of guanidine molecules (or ~71.4 mol % of the TMG remaining in the liquid phase) appeared to form bicarbonate in solution. Only ~12.6 mol % of the TMG appeared not to react to form soluble or insoluble products after the $CO_2$ purge. (~31.3 mol % of TMG molecules appeared to form bicarbonate in liquid phase; ~56.1 mol % appeared to precipitate from solution, presumably forming bicarbonate and losing solubility.) Precipitation of TMG-bicarbonate was confirmed by NMR on a solution that had been diluted with $D_2O$ until the precipitate was brought into the liquid phase again. At about 60 wt % concentration of $D_2O$ in this solution (or ~40 wt % of TMG), no slurry was observed, and the solution appeared completely transparent. According to a liquid NMR experiment on this sample (not shown here), about 100% of the TMG molecules appeared to react with $CO_2$. About 82% of the TMG appeared to form a bicarbonate, while the other ~18% appeared to form a carbamate, resulting in an initial loading of ~0.91 $CO_2$ per TMG. This appeared to confirm that the product in the initially precipitated phase was mostly TMG-bicarbonate. Thus, little carbamate was produced as a long lifetime product, as expected for a sterically hindered amine. This example shows that a significant amount of TMG can precipitate from ~70 wt % aqueous solution at ~90° C. after reaction with $CO_2$. Higher TMG concentrations can lead to precipitation at ~90° C. as well. At ambient temperatures, TMG concentrations above about 40 wt % were observed to lead to loss of solubility of the TMG-bicarbonate.

Although the present invention has been described in terms of specific embodiments, it need not necessarily be so limited. Suitable alterations/modifications for operation under specific conditions should be apparent to those skilled in the art. It is therefore intended that the following claims be interpreted as covering all such alterations/modifications as fall within the true spirit/scope of the invention.

What is claimed is:

1. A method for separating carbon dioxide from a gas stream, comprising:
    contacting a gas stream containing $CO_2$ in a sorption zone with a sorption solution comprising a promoter amine, wherein the promoter amine comprises a bridged derivative of piperidine or piperazine and at least one of a sterically hindered amine and a tertiary amine, the sorption solution having a total amine concentration of at least about 3.0 M, at a temperature of at least 10° C. to sorb at least a portion of the $CO_2$ into the sorption solution and form a rich stream of the sorbed $CO_2$ in the sorption solution comprising one or more amine-$CO_2$ reaction products dissolved in the solution;
    passing the rich stream from the sorption zone to a second zone and precipitating at least a portion of the amine-$CO_2$ reaction products to form a precipitate slurry;
    separating the precipitate slurry to form a portion enriched in precipitate solids and a first recycle stream, the first recycle stream comprising a majority of the solvent from the precipitate slurry; and
    passing the portion enriched in precipitate solids to one or more regeneration zones and desorbing the sorbed carbon dioxide as gas to form a second recycle stream, the second recycle stream containing a lower concentration of carbon dioxide than the rich stream and containing an increased concentration of total amine relative to the rich stream,
    wherein the aqueous sorption solution comprises at least a portion of the first recycle stream and at least a portion of the second recycle stream.

2. The method of claim 1, wherein the sterically hindered amine comprises an alkanolamine or an aminoether.

3. The method of claim 1, wherein the tertiary amine comprises an alkanolamine.

4. The process according to claim 1, wherein the total sterically hindered amine concentration or the total tertiary amine concentration in the sorption solution is at least about 2.5 M.

5. The process according to claim 1, wherein the total sterically hindered amine or the total tertiary amine concentration in the sorption solution is from about 5.0 M to about 8.0 M.

6. The process according to claim 1, wherein the promoter amine concentration in the amine solution is from 0.1 M to about 1.5 M.

7. The process according to claim 1, wherein the promoter amine concentration in the amine solution is about 9 wt % or less.

8. The process according to claim 1, wherein the $CO_2$ is contacted with the amine solution in the sorption zone at a temperature of about 25° C. to about 45° C.

9. The process according to claim 1, wherein the rich stream has a carbon dioxide loading of at least 0.4 mol $CO_2$ per mol of amine.

10. The process according to claim 1, wherein the $CO_2$ is contacted with the amine solution in the sorption zone at a carbon dioxide partial pressure of at least 0.025 bar.

11. The process according to claim 1, wherein the rich stream has a viscosity of about 10 cP or less.

12. The process according to claim 1, wherein the sorbed $CO_2$ is desorbed from the rich stream in at least one regeneration zone at a temperature higher than the temperature of the sorption zone.

13. The process according to claim 12, wherein the sorbed $CO_2$ is desorbed from the rich amine stream in at least one regeneration zone at a temperature of 95° C. or less.

14. The process according to claim 12, wherein the sorbed $CO_2$ is desorbed from the rich amine stream in at least one regeneration zone at a temperature of at least about 120° C.

15. The process according to claim 1, wherein the at least one regeneration zone comprises a flash desorption regeneration zone.

16. The process according to claim 1, wherein at least 70 wt % of the precipitate solids comprise a bicarbonate salt.

17. The process according to claim 1, wherein the $CO_2$-containing gas stream is contacted with the sorption solution at a temperature that is greater than a temperature in the precipitation zone by 20° C. or less.

18. The process according to claim 1, wherein the sorption solution comprises an aqueous sorption solution, a non-aqueous sorption solution, or a combination thereof.

19. A method for separating carbon dioxide from a gas stream, comprising:
contacting a gas stream containing carbon dioxide in a sorption zone with an aqueous sorption solution comprising a promoter amine and a sterically hindered amine, the sorption solution having a total amine concentration of at least about 3.0 M, at a temperature of at least 10° C. to sorb at least a portion of the carbon dioxide into the sorption solution and form a rich stream of the sorbed carbon dioxide in the sorption solution comprising amine-carbon dioxide reaction products dissolved in the solution;
passing the rich stream from the sorption zone to one or more regeneration zones and desorbing the sorbed carbon dioxide as gas to form a recycle stream, the recycle stream containing a lower concentration of carbon dioxide than the rich stream and containing an increased concentration of amine relative to the rich stream, the aqueous sorption solution comprising at least a portion of the recycle stream,
wherein the promoter amine comprises a bridged derivative of piperidine or piperazine.

20. The method of claim 19, wherein the sterically hindered amine comprises an alkanolamine or an aminoether.

21. A method for separating carbon dioxide from a gas stream, comprising:
contacting a gas stream containing carbon dioxide in a sorption zone with an aqueous sorption solution comprising a tertiary amine and about 9 wt % or less of a promoter amine, the sorption solution having a total amine concentration of at least about 3.0 M, at a temperature of at least 10° C. to sorb at least a portion of the carbon dioxide into the sorption solution and form a rich stream of the sorbed carbon dioxide in the sorption solution comprising amine-carbon dioxide reaction products dissolved in the solution;
passing the rich stream from the sorption zone to one or more regeneration zones and desorbing the sorbed carbon dioxide as gas to form a recycle stream, the recycle stream containing a lower concentration of carbon dioxide than the rich stream and containing an increased concentration of amine relative to the rich stream, the aqueous sorption solution comprising at least a portion of the recycle stream, wherein the promoter amine comprises a bridged derivative of piperidine or piperazine.

\* \* \* \* \*